(12) United States Patent
Karwa et al.

(10) Patent No.: US 11,854,056 B2
(45) Date of Patent: Dec. 26, 2023

(54) BUYER INITIATED AUTOMATIC SELLER ACCOUNT CREATION FOR ITEM

(71) Applicant: eBay Inc., San Jose, CA (US)

(72) Inventors: Dhaval D. Karwa, Portland, OR (US); Vanuj Juneja, San Jose, CA (US); Bindia Saraf, Sunnyvale, CA (US)

(73) Assignee: eBay Inc., San Jose, CA (US)

( * ) Notice: Subject to any disclaimer, the term of this patent is extended or adjusted under 35 U.S.C. 154(b) by 237 days.

(21) Appl. No.: 17/213,054

(22) Filed: Mar. 25, 2021

(65) Prior Publication Data
US 2022/0309551 A1  Sep. 29, 2022

(51) Int. Cl.
| | |
|---|---|
| G06Q 20/40 | (2012.01) |
| G06Q 20/32 | (2012.01) |
| G06Q 20/02 | (2012.01) |
| G06Q 30/0601 | (2023.01) |
| G06F 21/32 | (2013.01) |

(52) U.S. Cl.
CPC ......... *G06Q 30/0609* (2013.01); *G06F 21/32* (2013.01); *G06Q 20/02* (2013.01); *G06Q 20/3274* (2013.01); *G06Q 20/40145* (2013.01); *G06Q 30/0619* (2013.01)

(58) Field of Classification Search
CPC .............................................. G06Q 20/00–425
See application file for complete search history.

(56) References Cited

U.S. PATENT DOCUMENTS

| | | | | |
|---|---|---|---|---|
| 8,655,773 B1 * | 2/2014 | Fasoli | ..................... | G06Q 40/00 |
| | | | | 705/40 |
| 10,438,176 B2 | 10/2019 | Johnson et al. | | |
| 10,902,414 B1 * | 1/2021 | Kurani | ................ | G06Q 20/3274 |
| 11,288,661 B2 * | 3/2022 | Hammad | ............. | G06Q 20/326 |
| 11,470,079 B1 * | 10/2022 | Kurani | .................... | G06F 21/34 |
| 2014/0279533 A1 * | 9/2014 | Hamilton | ............... | G06Q 40/00 |
| | | | | 705/35 |

FOREIGN PATENT DOCUMENTS

| | | | | |
|---|---|---|---|---|
| CA | 2787817 A1 * | 2/2014 | ............. | G06Q 20/20 |
| WO | WO-2020123191 A1 * | 6/2020 | | |
| WO | 2020/224092 A1 | 11/2020 | | |

* cited by examiner

*Primary Examiner* — John W Hayes
*Assistant Examiner* — Chenyuh Kuo
(74) *Attorney, Agent, or Firm* — Shook, Hardy & Bacon L.L.P.

(57) ABSTRACT

Technologies are shown for buyer initiated automatic seller account generation where a buyer client receives an identification of a purchase item, generates an item token corresponding to the purchase item, and provides the item token to a seller client. The seller client authenticates a seller user with an authentication service, such as a biometric authentication service, receives an authentication token corresponding to the seller user, and sends an account creation request with the item token and the authentication token to an account creation service. The account creation service receives the account creation request, sends a user information request to the authentication service with the authentication token and receives seller information for the seller user from the authentication service. The account creation service creates a seller user account using the seller information, commits a purchase transaction for the purchase item, and sends an item purchase confirmation to the buyer client.

17 Claims, 14 Drawing Sheets

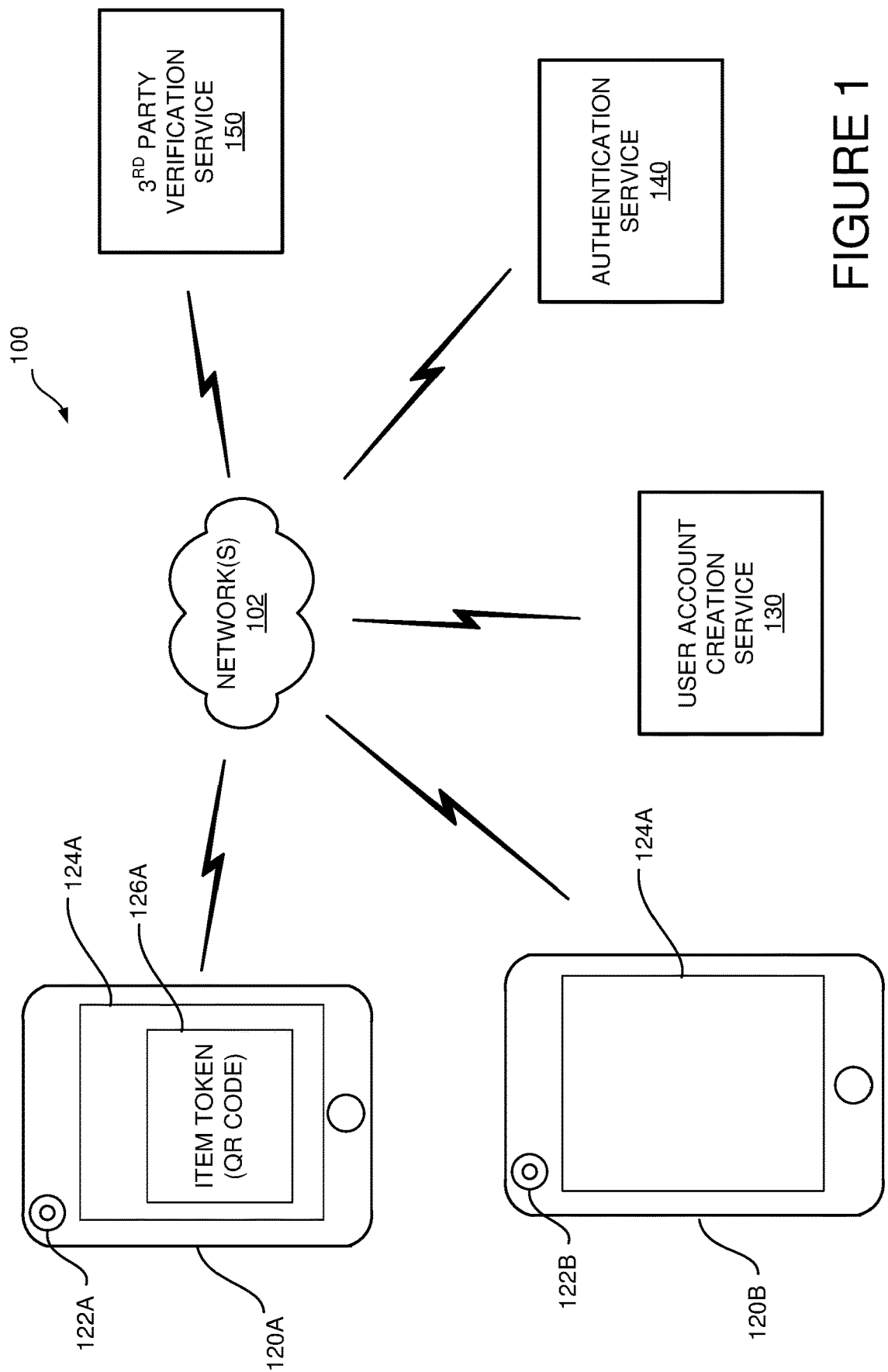

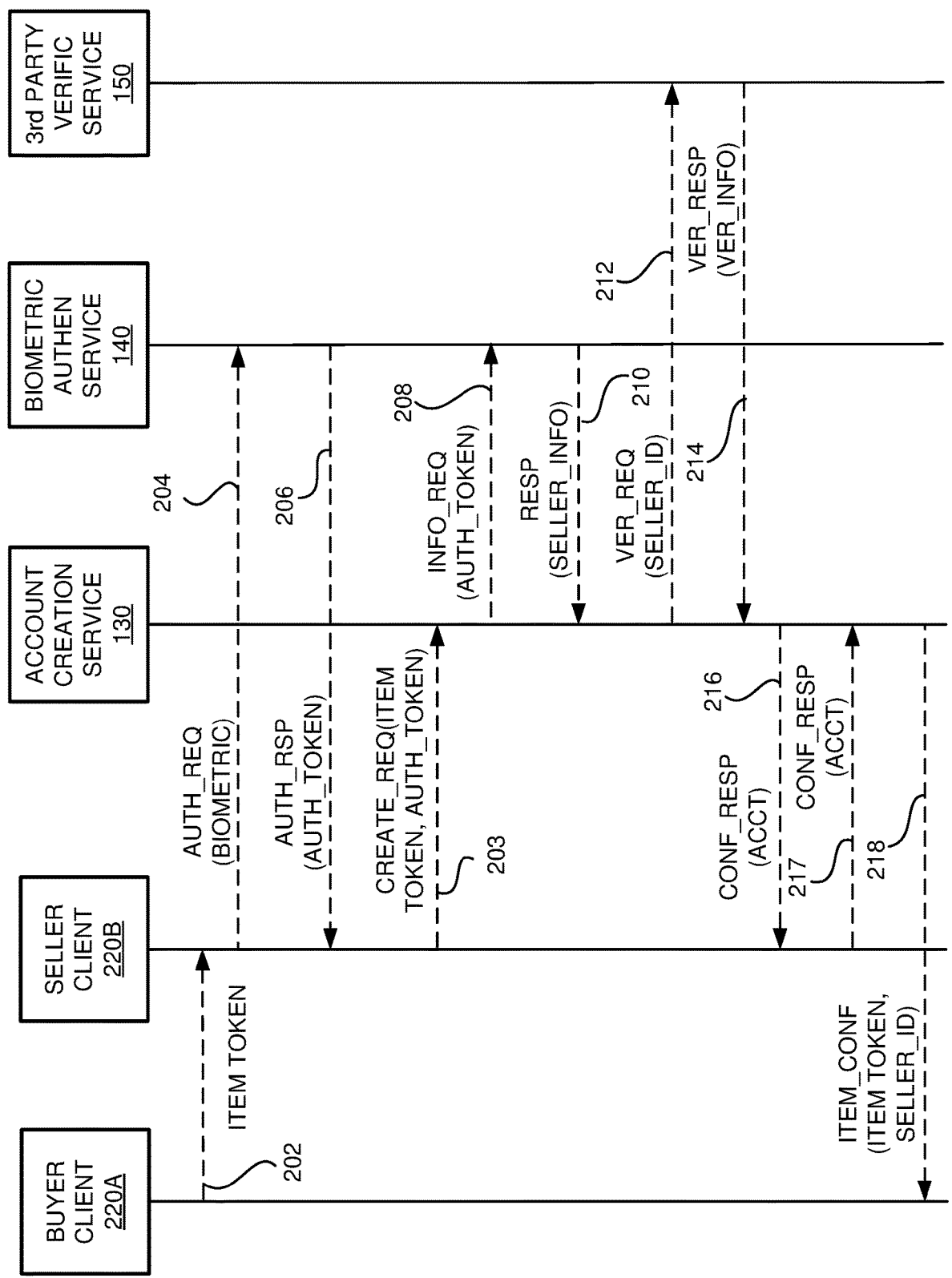

BUYER INITIATED AUTOMATIC SELLER ACCOUNT CREATION FOR ITEM

BACKGROUND

The disclosed technology relates to selling of items, such as in an art show, craft show, farmer's market or similar market. A buyer who wishes to purchase an item can make cash payment, but there are no formal means for warranty of the item or refunding the purchase price if the buyer is dissatisfied with the item. The buyer can often make payment using a credit or debit card, but, typically, the formal means for warranty or refund are limited, nonexistent, or unsuitable for the nature of the item or transaction.

The buyer may wish to have an intermediary entity handle the transaction. The intermediary entity can typically assist in verifying the seller's identity, maintaining the security of a payment, provide insurance or guarantees regarding the item, or provide for return of the item and refund of the payment price. However, the seller of the item may not have established an account with the intermediary entity.

It is with respect to these and other considerations that the disclosure made herein is presented.

SUMMARY

The disclosed technology is directed toward buyer initiated automatic seller account creation in an intermediary entity. The disclosed technology generally describes automatically creating a seller user account for a seller of an item where the automatic creation is initiated by a buyer client. For example, a buyer can initiate purchase of an item from a seller through an intermediary transaction service when the seller does not have an existing account with the intermediary transaction service. A seller account can be created using seller information obtained from a biometric authentication service that can authenticate the seller on the seller's client device.

In certain simplified examples of the disclosed technologies, a method, system or computer readable medium for buyer initiated seller account generation involves, in a buyer client: receiving a buyer user identification of a purchase item, and, responsive to receiving the buyer user identification of the purchase item, generating an item token corresponding to the purchase item, providing the item token to a seller client application. These examples further involve, in the seller client, receiving the item token and, responsive thereto: authenticating a seller user of the seller client with an authentication service, receiving an authentication token corresponding to the seller user from the authentication service, sending an account creation request to an account creation service, the account creation request including the item token and the authentication token; in the account creation service, receiving the account creation request and, responsive thereto: sending a user information request to the authentication service with the authentication token, receiving seller information from the authentication service responsive to the user information request, the seller information corresponding to the seller user, creating a seller user account using at least some of the seller information received from the authentication service, committing a purchase transaction for the purchase item, and sending an item purchase confirmation to the buyer client, the item purchase confirmation including the item token.

Other examples of the disclosed technology involve, in the account creation service: responsive to receiving the seller user information from the authentication service, sending a verification request to a verification service, the verification request including at least some of the seller user information received from the authentication service; receiving a verification response from the verification service; and the step of creating a seller user account using at least some of the seller information received from the authentication service comprises, responsive to receiving the verification response, creating a seller user account using at least some of the seller information received from the authentication service.

In still other examples of the disclosed technology, the authentication service can be a biometric confirmation service; and the step of authenticating a seller user with an authentication service involves authenticating a seller user with an authentication service using biometric data collected from the seller user by the seller client.

In yet other examples of the disclosed technology, the step of creating a seller user account using at least some of the seller information received from the authentication service involves: sending an account confirmation request that includes at least a portion of the seller user information to the seller client; receiving an account confirmation response from the seller client that includes at least the portion of the seller user information; and, if the seller user information in the account confirmation response from the seller client is different from the seller user information sent to the seller client, revising the seller user information used to create the seller user account.

Certain examples of the disclosed technology involve: in the buyer client, sending the item token to the account creation service with buyer account information associated with the buyer user; in the account creation service, receiving the item token and the buyer account information associated with the buyer user; the step of committing a purchase transaction for the purchase item comprises: identifying the buyer account information received with the item token; transferring payment for the item that corresponds to the item token from a buyer account determined from the buyer account information to the seller user account.

Additional examples of the disclosed technology involve, in the account creation service: sending a purchase confirmation request with the item token corresponding to the purchase item to the buyer client; receiving a purchase confirmation response with the item token corresponding to the purchase item from the buyer client; responsive to receiving the purchase confirmation response: identifying the buyer account information received with the item token; and transferring payment for the item that corresponds to the item token from a buyer account determined from the buyer account information to the seller user account.

In particular examples of the disclosed technology, the item token further includes a machine readable code; the method includes, in the buyer client, displaying the machine readable code; the step of, in the seller client, receiving the item token from a buyer client involves scanning the machine readable code displayed by the buyer client to obtain the item token.

In other simplified examples of the disclosed technologies, a method, system or computer readable medium for buyer initiated seller account generation, the examples involve, in a buyer client: receiving a buyer user identification of a purchase item, responsive to receiving the buyer user identification of the purchase item, generating an item token corresponding to the purchase item, providing the item token to a seller client application; in the seller client, receiving the item token and, responsive thereto: authenticating a seller user of the seller client with an authentication service; receiving an authentication token corresponding to the seller user from the authentication service; sending an account creation request to an account creation service, the account creation request including the item token and the authentication token; in the account creation service, receiving an account creation request from a seller client, the account creation request including an item token corresponding to a purchase item identified by a buyer client and an authentication token corresponding to a seller user; responsive to receiving the account creation request from the seller client, sending a user information request to the authentication service with the authentication token; receiving seller information from the authentication service responsive to the user information request, the seller information corresponding to the seller user; creating a seller user account using at least some of the seller information received from the authentication service; committing a purchase transaction for the purchase item; and sending an item purchase confirmation to the buyer client, the item purchase confirmation including the item token.

Some of these examples involve, responsive to receiving the seller user information from the authentication service, sending a verification request to a verification service, the verification request including at least some of the seller user information received from the authentication service; receiving a verification response from the verification service; and the step of creating a seller user account using at least some of the seller information received from the authentication service involves, responsive to receiving the verification response, creating a seller user account using at least some of the seller information received from the authentication service.

In yet others of these examples, the operation of creating a seller user account using at least some of the seller information received from the authentication service involves: sending an account confirmation request that includes at least a portion of the seller user information to the seller client; receiving an account confirmation response from the seller client that includes at least the portion of the seller user information; and if the seller user information in the account confirmation response from the seller client is different from the seller user information sent to the seller client, revising the seller user information used to create the seller user account.

Particular ones of these examples also involve receiving the item token and the buyer account information associated with the buyer user from the buyer client; the operation of committing a purchase transaction for the purchase item involves: identifying the buyer account information received with the item token; and transferring payment for the item that corresponds to the item token from a buyer account determined from the buyer account information to the seller user account.

Still more of these examples include: sending a purchase confirmation request with the item token corresponding to the purchase item to the buyer client; receiving a purchase confirmation response with the item token corresponding to the purchase item from the buyer client; responsive to receiving the purchase confirmation response: identifying the buyer account information received with the item token; and transferring payment for the item that corresponds to the item token from a buyer account determined from the buyer account information to the seller user account.

In additional ones of these examples, the item token includes a machine readable code generated by the buyer client.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings. This Summary is provided to introduce a selection of concepts in a simplified form that are further described below in the Detailed Description.

This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items.

FIG. 1 is an architectural diagram illustrating one example of an environment for buyer initiated seller account creation in accordance with the disclosed technology;

FIG. 2 is a messaging diagram showing an illustrative example of message and data exchange in accordance with the disclosed technology;

DETAILED DESCRIPTION

Figure 3A:
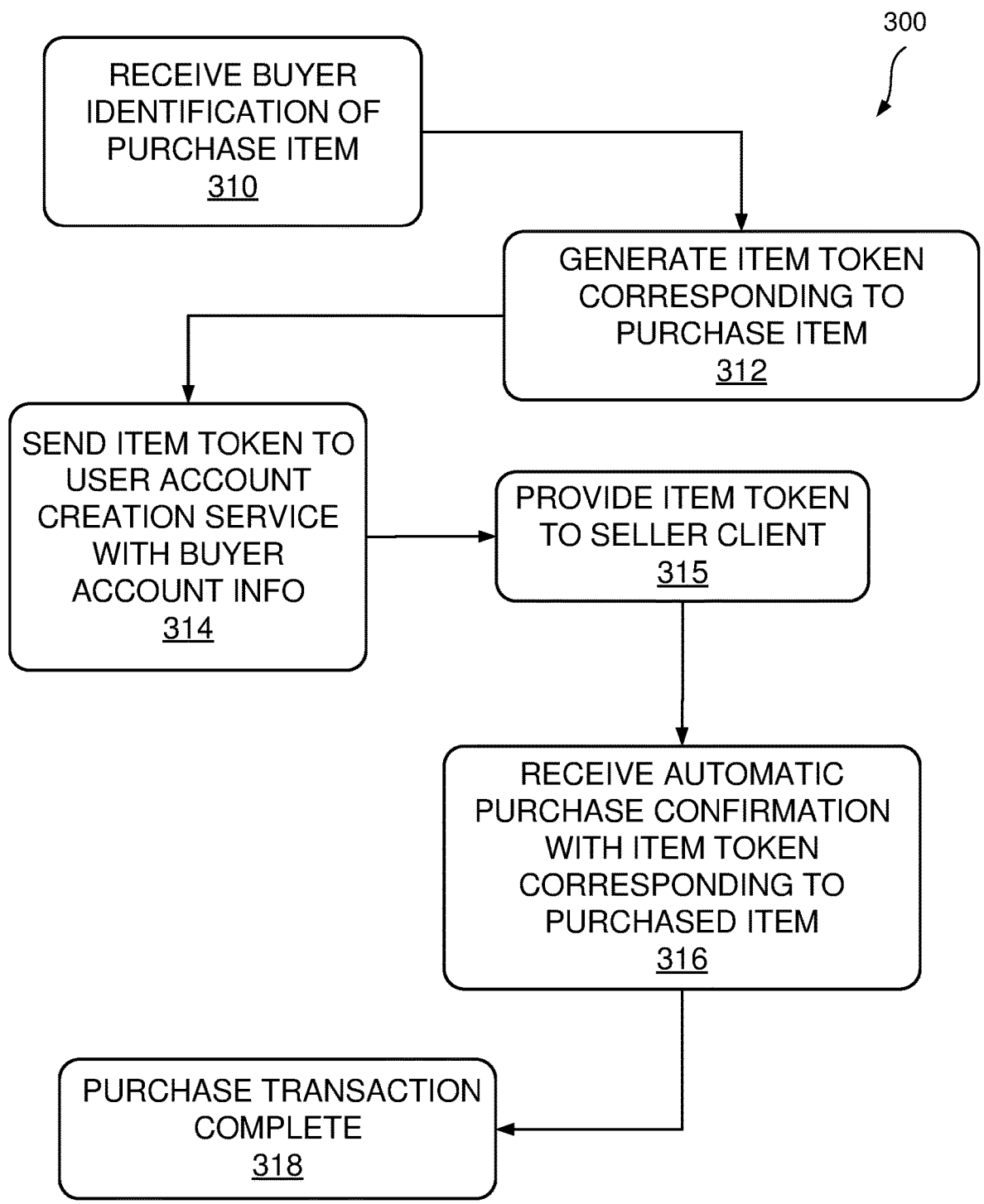
FIG. 3A is a control flow diagram showing an illustrative example of a process in a buyer client in accordance with the disclosed technology where an item is automatically purchased.

The following Detailed Description describes technologies for buyer initiated automatic seller account creation. Certain examples of the disclosed technology can automatically create a seller user account for an item identified for purchase by a buyer user using a buyer client application. Because these examples of the disclosed technology can automatically create a seller account in response to a buyer's request, the disclosed technology can offer a technical advantage of improved security for a purchase transaction. In addition, because the seller account is automatically created in the disclosed technology, the interactions with a seller user for seller account creation are reduced which offers a technical advantage of improved efficiency for use of computer and network resources.

Other examples of the disclosed technology can utilize seller information obtained from a biometric authentication service for the seller to create the seller account. Because these examples of the disclosed technology can utilize seller information obtained from a biometric authentication service for the seller to create the seller account to reduce the interactions with a seller user for seller account creation that could be intercepted by malicious actors, the disclosed technology can offer a technical advantage of further improved security for seller account creation. In addition, the use of seller information obtained from a biometric authentication service for the seller to create the seller account can reduce the interactions with a seller user for seller account creation which offers a technical advantage of additional improved efficiency for use of computer and network resources in seller account creation.

Particular examples of the disclosed technology can identify the item for purchase in the account creation. Because these examples of the disclosed technology can identify the item for purchase in the account creation, the disclosed technology can offer a technical advantage of further improved security by reducing exposure of additional interactions for the purchase transaction that could be intercepted by malicious actors. In addition, the identification of the item for purchase in the account creation can reduce the interactions with the purchaser during a purchase transaction which offers a technical advantage of additional improved efficiency for use of computer and network resources in purchase transactions.

Further examples of the disclosed technology can automatically execute a payment transaction between buyer to seller in association with the item and the account creation. Because these examples of the disclosed technology can automatically execute a payment transaction between buyer to seller in association with the item and the account creation without exposing the transaction to additional interactions that could be intercepted by malicious actors, the disclosed technology can offer a technical advantage of further improved security for the purchase transaction because the buyer has identified the item for purchase. In addition, the automatic execution of the payment transaction for purchase of the item reduces the user interactions with the buyer and seller for the purchase transaction, which offers a technical advantage of additional improved efficiency for use of computer and network resources in purchase transactions.

As will be described in more detail herein, it can be appreciated that implementations of the techniques and technologies described herein may include the use of solid state circuits, digital logic circuits, computer components, and/or software executing on one or more input devices. Signals described herein may include analog and/or digital signals for communicating a changed state of the data file or other information pertaining to the data file.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including multiprocessor systems, mainframe computers, microprocessor-based or programmable consumer electronics, minicomputers, hand-held devices, and the like.

Other technical effects other than those mentioned herein can also be realized from implementation of the technologies disclosed herein.

In the following detailed description, references are made to the accompanying drawings that form a part hereof, and in which are shown by way of illustration specific configurations or examples. Referring now to the drawings, in which like numerals represent like elements throughout the several figures, aspects of a computing system, computer-readable storage medium, and computer-implemented methodologies for buyer initiated seller account creation will be described. As will be described in more detail below with respect to the figures, there are a number of applications and services that may embody the functionality and techniques described herein.

FIG. 1 is an architectural diagram illustrating one example of an environment 100 for buyer initiated seller account creation in accordance with the disclosed technology. A buyer client device 120A and a seller client device 120B are in communication with a network 102. A user account creation service 130 of an intermediary transaction service, an authentication service 140, and a third party verification service 150 are also in communication with network 102. Each of the buyer client device 120A, seller client device 120B, user account creation service 130, authentication service 140, and third party verification service 150 can communicate with one or more of each other device or service through network 102.

Buyer client device 120A can include a buyer client application that can utilize the device 120A to capture information regarding an item that a buyer user wishes to purchase. For example, device 120A can be utilized to capture one or more of a photo of the item, a price tag on the item, or a barcode on the item. In addition, object recognition functionality available in device 120A can be utilized to identify the item and obtain additional item information. The buyer user can also enter identifying information for the item via a user interface of device 120A.

In certain examples of the disclosed technology, the buyer client application on client device 120A can generate an item token 126A corresponding to the item that can be transferred to the seller client application in seller client device 120B. The item token can be a unique code that can securely identify the item identified for purchase by the buyer.

For example, the buyer client application can generate and display on user interface 124A a QR code as item token 126A that can be read by the seller client application using a camera 122B in seller client device 120B. In other examples, the item token 126A can be transmitted in a message, e.g. a Bluetooth communication or Airdrop message, from buyer client device 120A to seller client device 120B. Other implementations for transferring the item token 126A from the buyer client application in buyer client device 120A to the seller client application in seller client device 120B are possible without departing from the scope of the disclosed technology.

FIG. 2 is a messaging diagram showing an illustrative example of a data exchange 200 in accordance with the disclosed technology. At 202, buyer client application 220A transfers the ITEM TOKEN to seller client application 220B. At 204, seller client application 220B authenticates the seller user with biometric authentication service 140 using the seller's biometric information collected by seller client device 120B, e.g. a fingerprint or optical scan.

At 206, in this example, seller client 220B send an authentication request with the seller's biometric data to biometric authentication service 140. If the seller is authenticated, then authentication service 140 responds, at 206, with an AUTHENTICATION TOKEN corresponding to the seller and indicating that the seller has been successfully authenticated. The authentication token can be a unique code that can securely identify the seller user.

At 203, seller client 220B sends an account creation request to user account creation service 130 of the intermediate transaction service, where the creation request includes the ITEM TOKEN provided by buyer client 220A and the AUTHENTICATION TOKEN provided by authentication service 140.

At 208, user account creation service 130 sends an information request that includes the AUTHENTICATION TOKEN to authentication service 140. At 210, the authentication service 130 responds with the seller's information, such as identity, address, etc. At 212, user account creation service 130 can send a verification request with the seller's identification SELLER_ID, such as social security number or a bank account number, to a third party verification service, such as a governmental entity, a financial entity, a credit reporting service, or a notary service. At 214, the verification service 150 responds with a verification response that can include verification information VER_INFO, such as financial information verifying a valid account for payment.

At 216, in this example, the creation service 130 sends an account creation confirmation request to seller client 220B for a seller user account ACCT for the seller user to authorize the creation of a seller user account. In some examples, the account creation confirmation request can include information for the seller SELLER_INFO obtained from authentication service 140 for confirmation or revision by the seller user. At 217, seller client 220B sends an account creation confirmation response to creation service 130. In some examples, the account creation confirmation response can include revised seller account information provided by the seller user.

When the creation service 130 receives the account creation confirmation response 217 from seller client 220B, it creates the seller user account, which can include a listing for the item corresponding to the item token. At 218, the creation service 130 can send an item confirmation with the ITEM TOKEN to the buyer client 220A to notify the buyer user that the seller user account has been created. In some examples, the item confirmation can identify the item corresponding to the ITEM TOKEN. In certain examples, the item confirmation can request authorization from the buyer user to execute a purchase transaction for the item. In other examples, the user account creation service can be configured to automatically execute a purchase transaction of the item for the buyer user and the item confirmation message confirms the transaction.

FIG. 3A is a control flow diagram showing an illustrative example of a process 300 in a buyer client, e.g. 220A, in accordance with the disclosed technology where an item is automatically purchased when a seller user account is automatically created.

At 310, an identification of a purchase item is received, e.g. through camera 122A of buyer client device or user interface 124A of buyer client device 120A. At 312, an item token corresponding to the identified item is generated. At 314, the item token is sent to a user account creation service, e.g. service 130A of an intermediary entity, along with buyer account information. At 315, the item token is provided to a seller client, e.g. via a QR code displayed on a user interface of the buyer client device or a wireless message containing the item token sent to the seller client device.

In this example, which provides for automatic purchase of the item identified by the buyer, at 316, an automatic purchase confirmation with the item token corresponding to the purchased item is received in the buyer client. At 318, the purchase transaction is completed. In some examples, confirmation of payment can be provided to the seller client, e.g. via display or message.

Figure 3B:
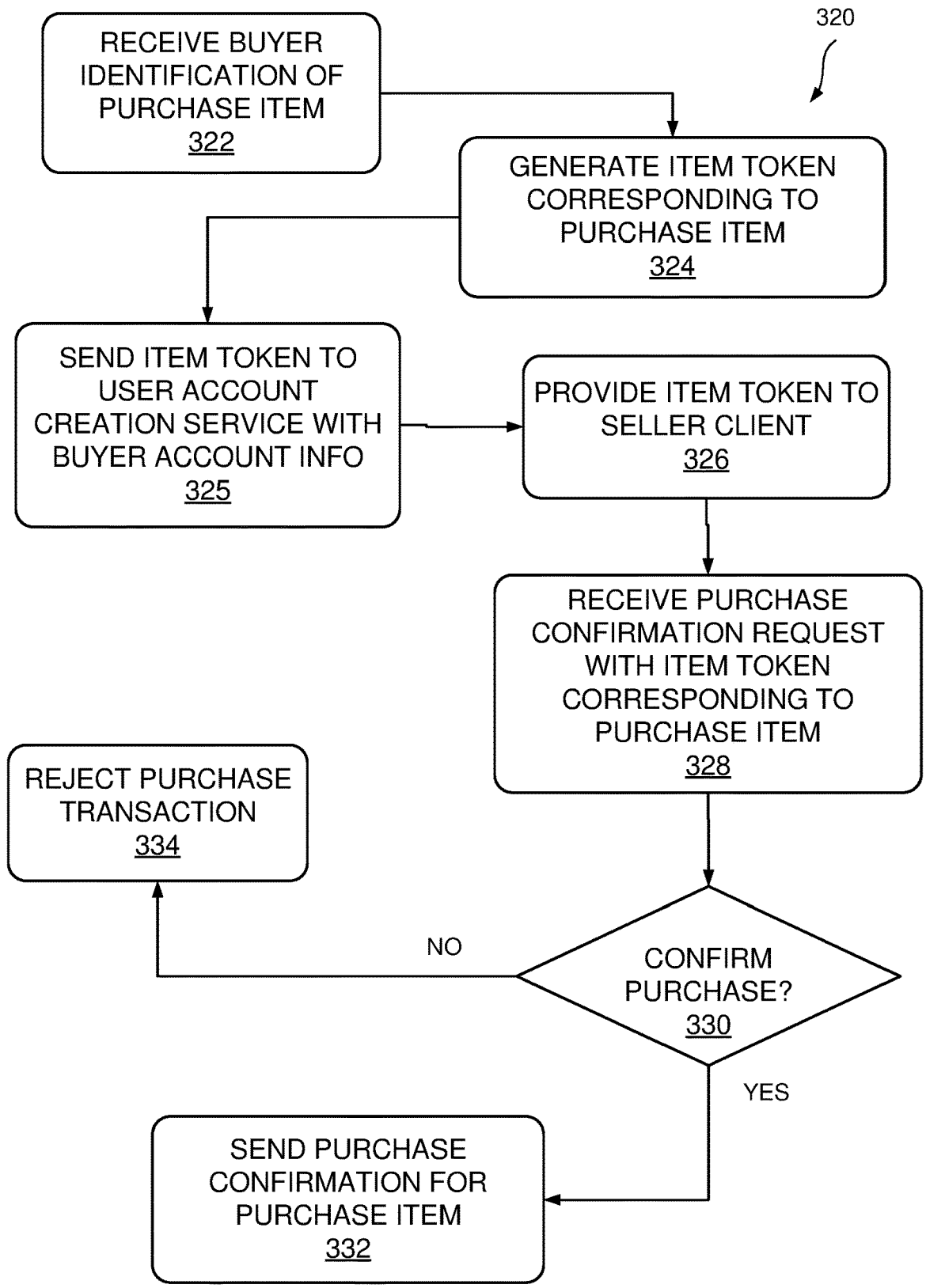
FIG. 3B is a control flow diagram showing another illustrative example of a process in a buyer client in accordance with the disclosed technology where a buyer user confirms purchase of an item.

FIG. 3B is a control flow diagram showing another illustrative example of a process 320 in a buyer client in accordance with the disclosed technology where a buyer user confirms purchase of an item. At 322, an identification of a purchase item is received. At 324, an item token corresponding to the identified item is generated. At 325, the item token is sent to a user account creation service in accordance with the disclosed technology. At 326, the item token is provided to a seller client.

At 328, a purchase confirmation request is received that includes the item token corresponding to the purchase item. The buyer user can use a user interface of a buyer client device to confirm the purchase and control branches from 330 to 332 to send a purchase confirmation for the purchase item to the user client creation service. The buyer user can also reject the purchase transaction, e.g. through user input or a timeout event, and control branches from 330 to 334.

Figure 3C:
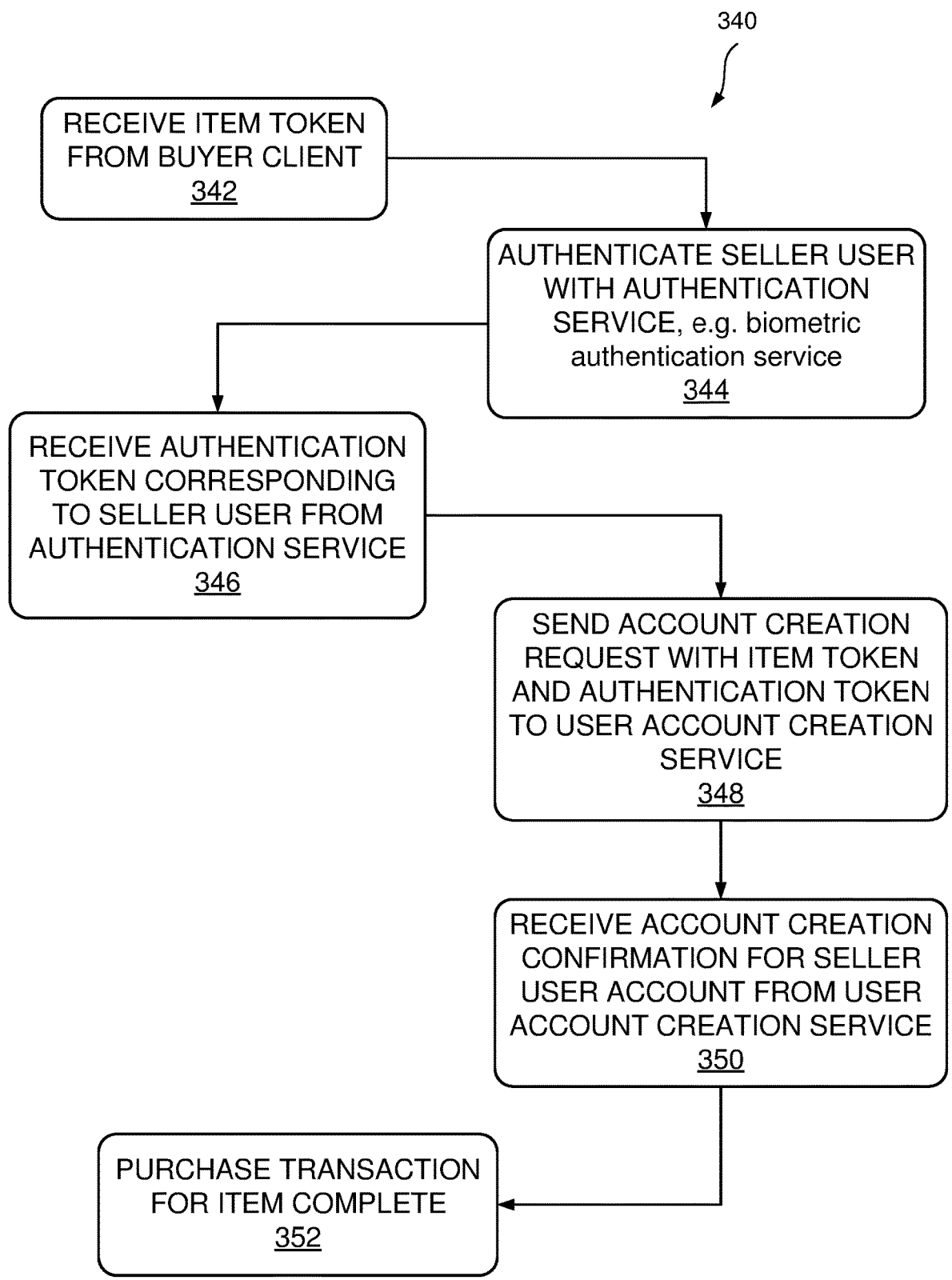
FIG. 3C is a control flow diagram showing an illustrative example of a process in a seller client in accordance with the disclosed technology where an item is automatically purchased.

FIG. 3C is a control flow diagram showing an illustrative example of a process 340 in a seller client, such as seller client 120B in FIG. 1, in accordance with the disclosed technology where an item is automatically purchased. At 342, an item token for an item identified for purchase by the buyer is received from a buyer client, e.g. by optically scanning a QR code displayed on the buyer client device or receiving a message with the item token from the buyer client device.

At 344, the seller client device authenticates the seller user with an authentication service, such as a biometric authentication service that utilizes the seller user's input fingerprint data to authenticate the user. At 346, an authentication token corresponding to the seller user is received from the authentication service. At 348, an account creation request with the item token and authentication token is sent to a user account creation service, e.g. the user account creation service of an intermediary entity.

At 350, an account creation confirmation is received from the user account creation service confirming that the seller user account was created. Because this example is directed toward automatic execution of a purchase transaction for the purchase item, the purchase transaction for the item is complete at 352. Note that in some examples, the purchase confirmation can be included in the account creation confirmation. In other examples, the purchase confirmation can be a separate message.

Figure 3D:
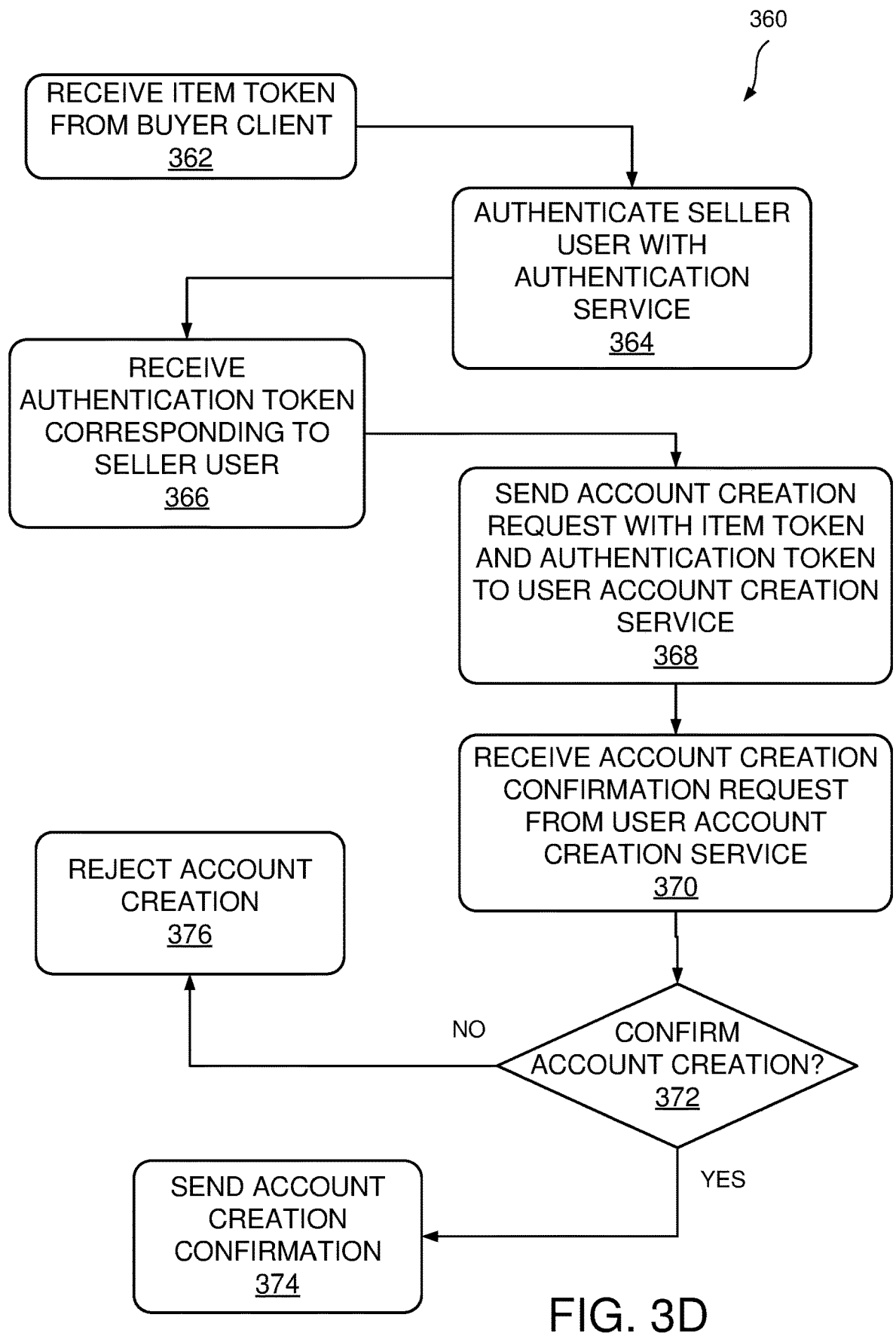
FIG. 3D is a control flow diagram showing another illustrative example of a process in a seller client in accordance with the disclosed technology where a seller user confirms creation of a seller user account.

FIG. 3D is a control flow diagram showing another illustrative example of a process 360 in a seller client in accordance with the disclosed technology where a seller user confirms creation of a seller user account before the seller user account is created by the user account creation service.

At 362, an item token is received from a buyer client. At 364, the seller user is authenticated with an authentication service. At 366, an authentication token corresponding to the seller user is received from the authentication service. At 368, an account creation request with the item token and the authentication token is sent to the user account creation service.

At 370, an account creation confirmation request is received from the user account creation service. At 372, the seller user can confirm or reject creation of the seller user account, such as by using a user interface of the seller client device. If the seller confirms the account creation, then control branches to 374 to send an account creation confirmation to the user account creation service. If the seller rejects the account creation, then control branches to 376.

Figure 3E:
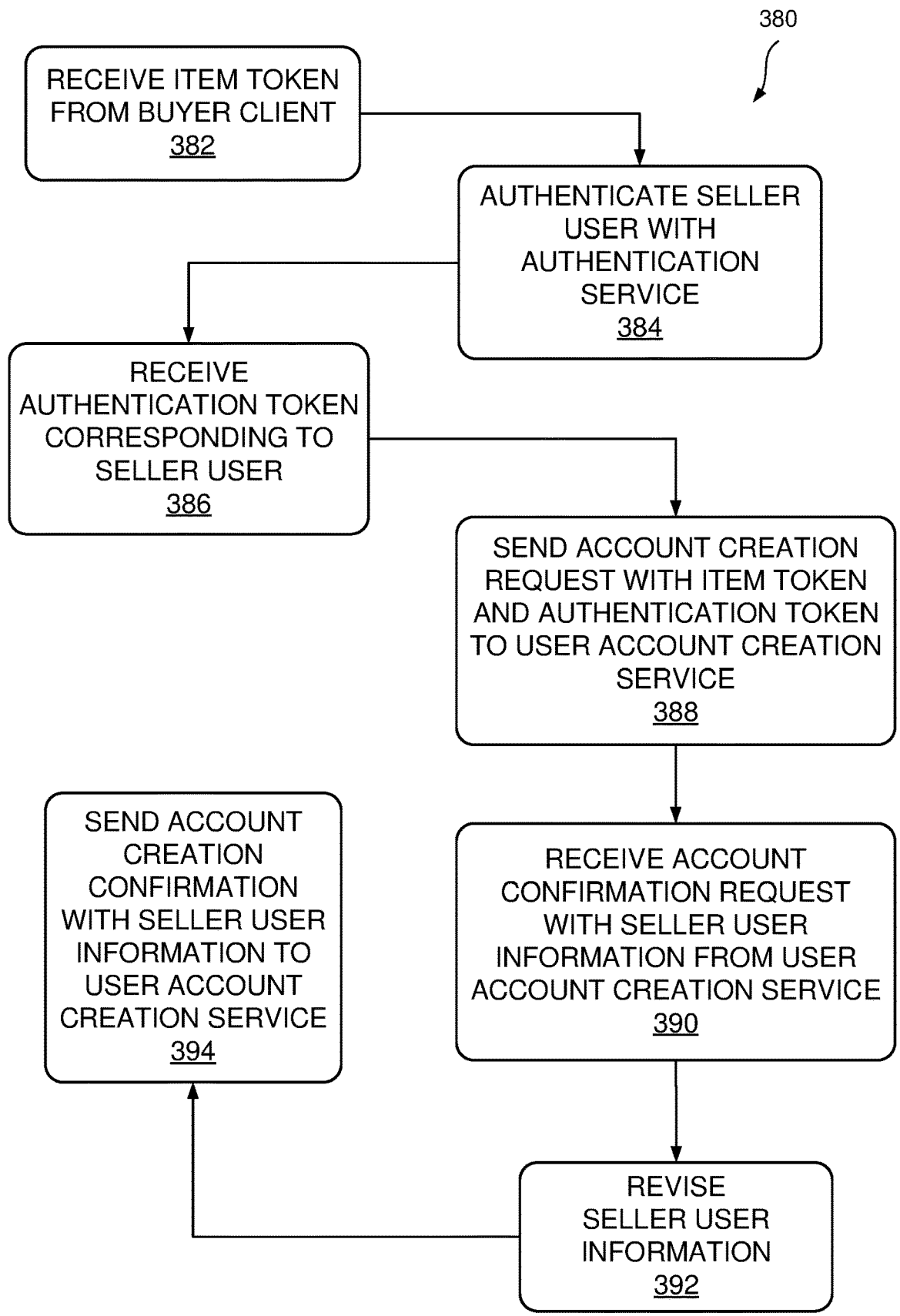
FIG. 3E is a control flow diagram showing another illustrative example of a process in a seller client in accordance with the disclosed technology where a seller user can revise seller information from an authentication service for creation of a seller user account.

FIG. 3E is a control flow diagram showing yet another illustrative example of a process 380 in a seller client in accordance with the disclosed technology where a seller user can revise seller information from an authentication service for creation of a seller user account.

At 382, an item token is received from a buyer client. At 384, the seller user is authenticated with an authentication service. At 386, an authentication token corresponding to the seller user is received from the authentication service. At 388, an account creation request with the item token and the authentication token is sent to the user account creation service.

At 390, an account confirmation request is received from the user account creation service that includes seller user information. This seller user information, in this example, was obtained from the authentication service using the authentication token.

At 392, the seller user can revise the seller user information using, for example, a user interface of the seller client device. At 394, an account creation confirmation with the seller user information, which may have been revised, is sent to the user account creation service, which will utilize the revised seller user information to create the seller user account.

Figure 4A:
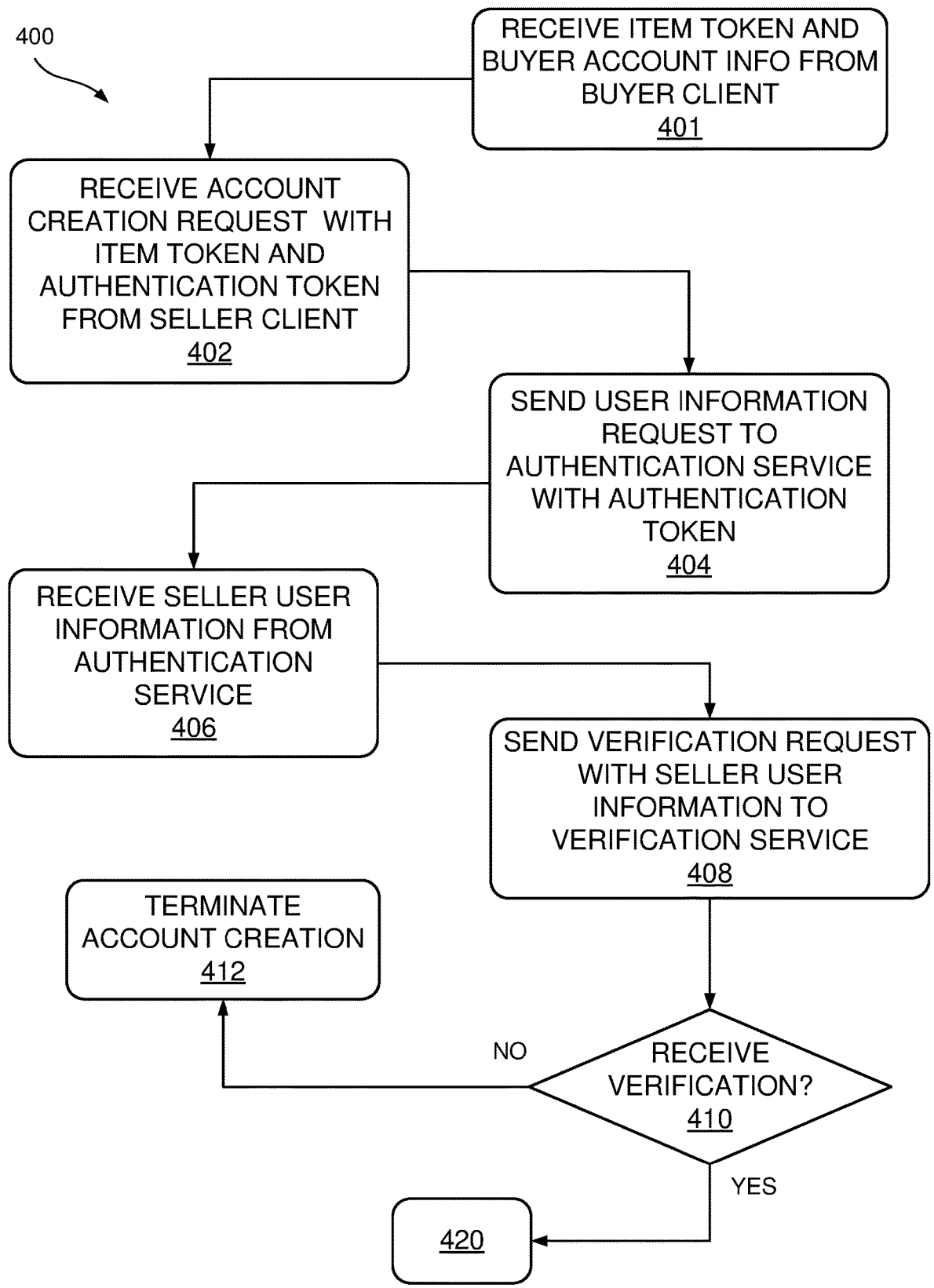
FIG. 4A is a control flow diagram showing an illustrative example of a process in a user account creation service in accordance with the disclosed technology.

FIG. 4A is a control flow diagram showing an illustrative example of a process 400 in a user account creation service in accordance with the disclosed technology. At 402, an account creation request with an item token and an authentication token is received from a seller client. At 404, a user information request is sent to the authentication service with the authentication token. The authentication token was previously generated by the authentication service when the seller user was authenticated.

At 406, the user information for the seller user is received from the authentication service. The seller user information can be utilized to create the seller user account.

In this example, at 408, a verification request containing at least some of the seller user information, e.g. a bank account or credit card number, is sent to a verification service, e.g. a bank or credit card processor, to verify the seller user information, e.g. verify that the bank account or credit card is valid and belongs to the seller user. If the seller user information cannot be successfully verified, control branches to 412 to terminate account creation. If verification is successful, control branches to 420 of FIG. 4B for further processing.

Figure 4B:
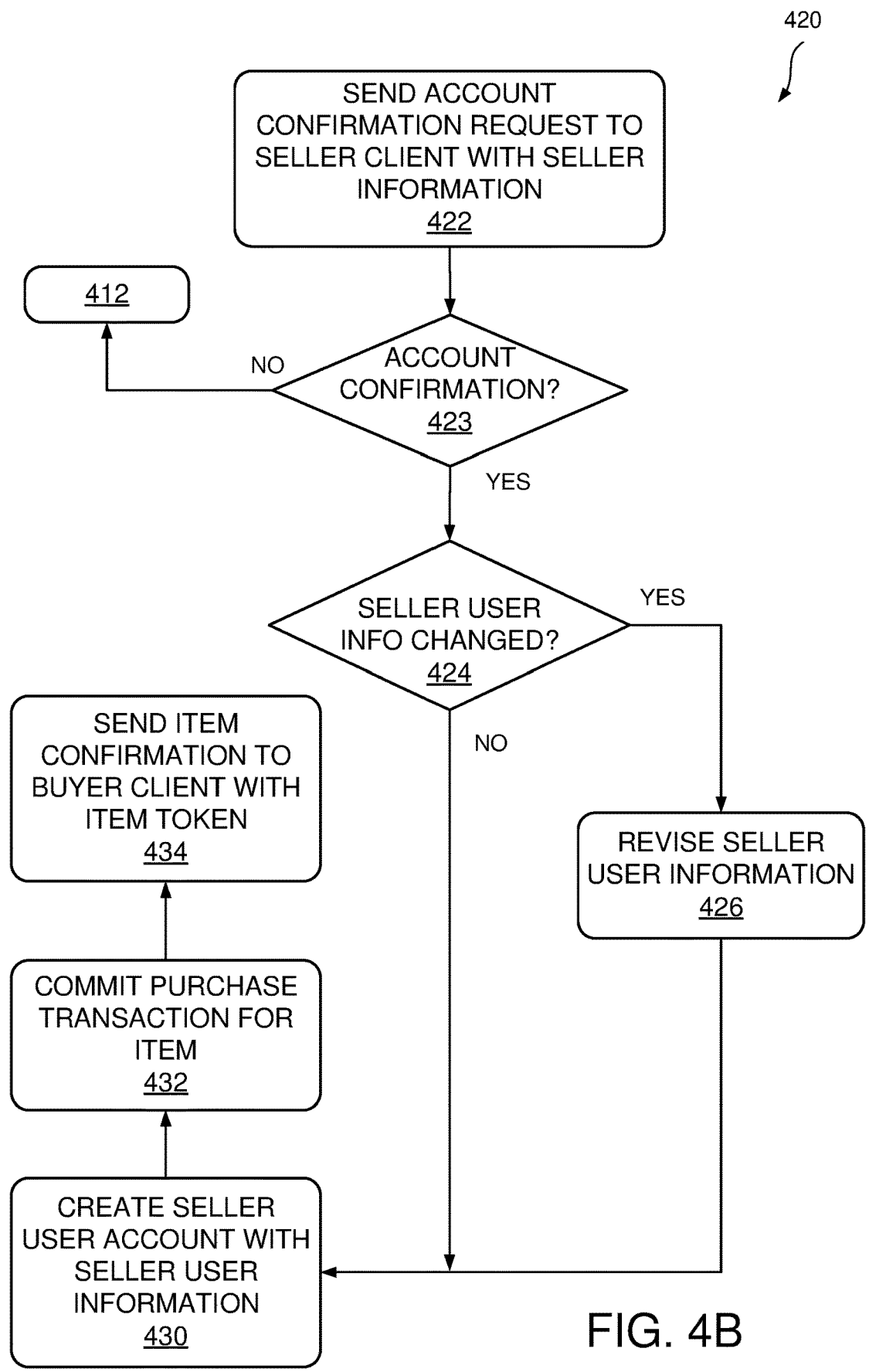
FIG. 4B is a control flow diagram showing additional process operations for an illustrative example of a process in a user account creation service in accordance with the disclosed technology.

FIG. 4B is a control flow diagram showing an illustrative example of further process operations 420 in accordance with the disclosed technology in a user account creation service involving that automatically executes payment transfer for a purchase transaction when the seller user account is created.

In the example of FIG. 4B, at 422, an account confirmation request with the seller information is sent to the seller client. If an account confirmation is not received at 423, then control branches to 412 of FIG. 4A to terminate account creation.

If an account confirmation is received at 423, control branches to 424 to determine if the seller information was revised by the seller user. If the seller user information was revised, then control branches to 426 to revise the seller user information in the user account creation service and then to 430 to create the seller user account with the revised seller user information. If the seller user information was not revised by the seller user, then control branches at 424 to 430 to create the seller user account with the original seller user information.

At 432, the purchase transaction for the item corresponding to the item token is committed. In some examples, the purchase transaction can be performed automatically upon successful creation of the seller user account. In other examples, the buyer can be prompted to confirm the purchase before the transaction is committed. These different approaches are discussed below.

Figure 4C:
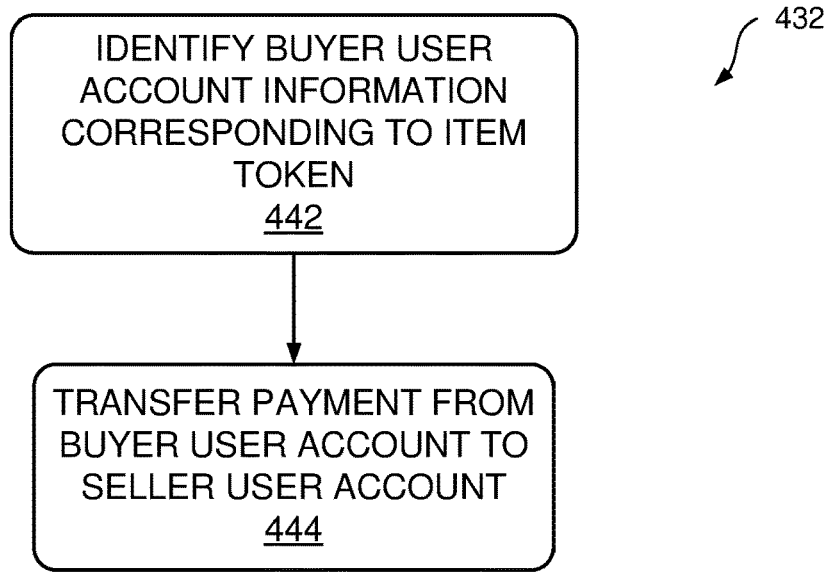
FIG. 4C is a control flow diagram showing an illustrative example of a process for automatic payment transfer in a user account creation service in accordance with the disclosed technology.

FIG. 4C is a control flow diagram showing an illustrative example of a process for the confirmation of payment transfer step 432 of FIG. 4B in a user account creation service in accordance with the disclosed technology, where the purchase transaction occurs automatically.

At 442, the buyer user account information corresponding to the item token for the purchase item is identified. Note that the item token with the buyer account information was sent to the user account creation service at operation 314 in FIG. 3A and at operation 325 in FIG. 3B. The buyer account information can be stored in association with the item token in the user account creation service. At 444, payment for the item corresponding to the item token is automatically transferred from the buyer user account to the seller user account.

Figure 4D:
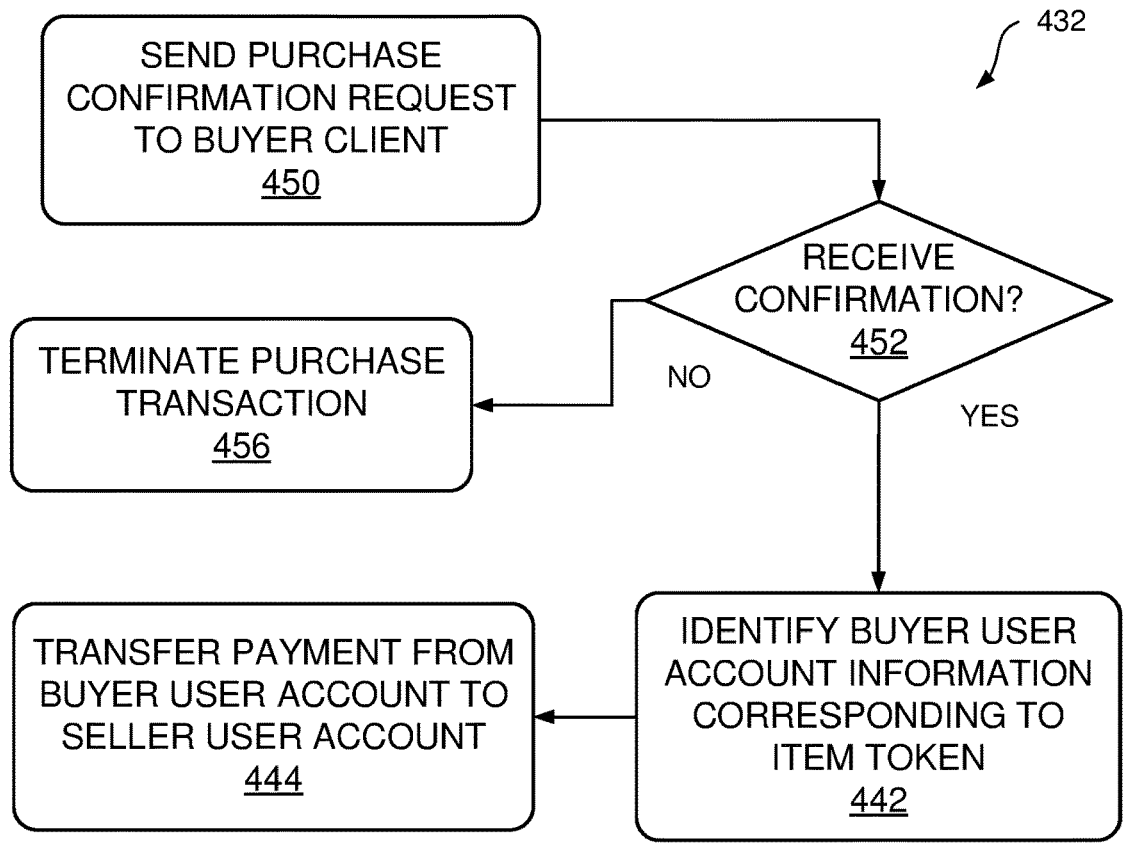
FIG. 4D is a control flow diagram showing another illustrative example of a process for confirmation of payment transfer in a user account creation service in accordance with the disclosed technology.

FIG. 4D is a control flow diagram showing another illustrative example of a process for the confirmation of payment transfer step 432 of FIG. 4B in a user account creation service in accordance with the disclosed technology, where the purchase transaction is confirmed by the buyer user before the transaction is committed.

At 450, a purchase confirmation request is sent to the buyer client. Note that this confirmation request can include the item token to identify the purchase item to be confirmed. If a purchase confirmation is not received at 452, then control branches to 456 to terminate the purchase transaction.

If a purchase confirmation is received at 452, then control branches to 442 to identify the buyer user account information corresponding to the item token and 444 to transfer payment from the buyer user account to the seller user account.

Client devices are frequently configured for authentication of a user utilizing the user's biometric data, e.g. fingerprint data, retinal data, etc. However, while conventional authentication services often have access to user information for a user of a device, these services are generally not configured to provide user information for the user to other services.

Figure 4E:
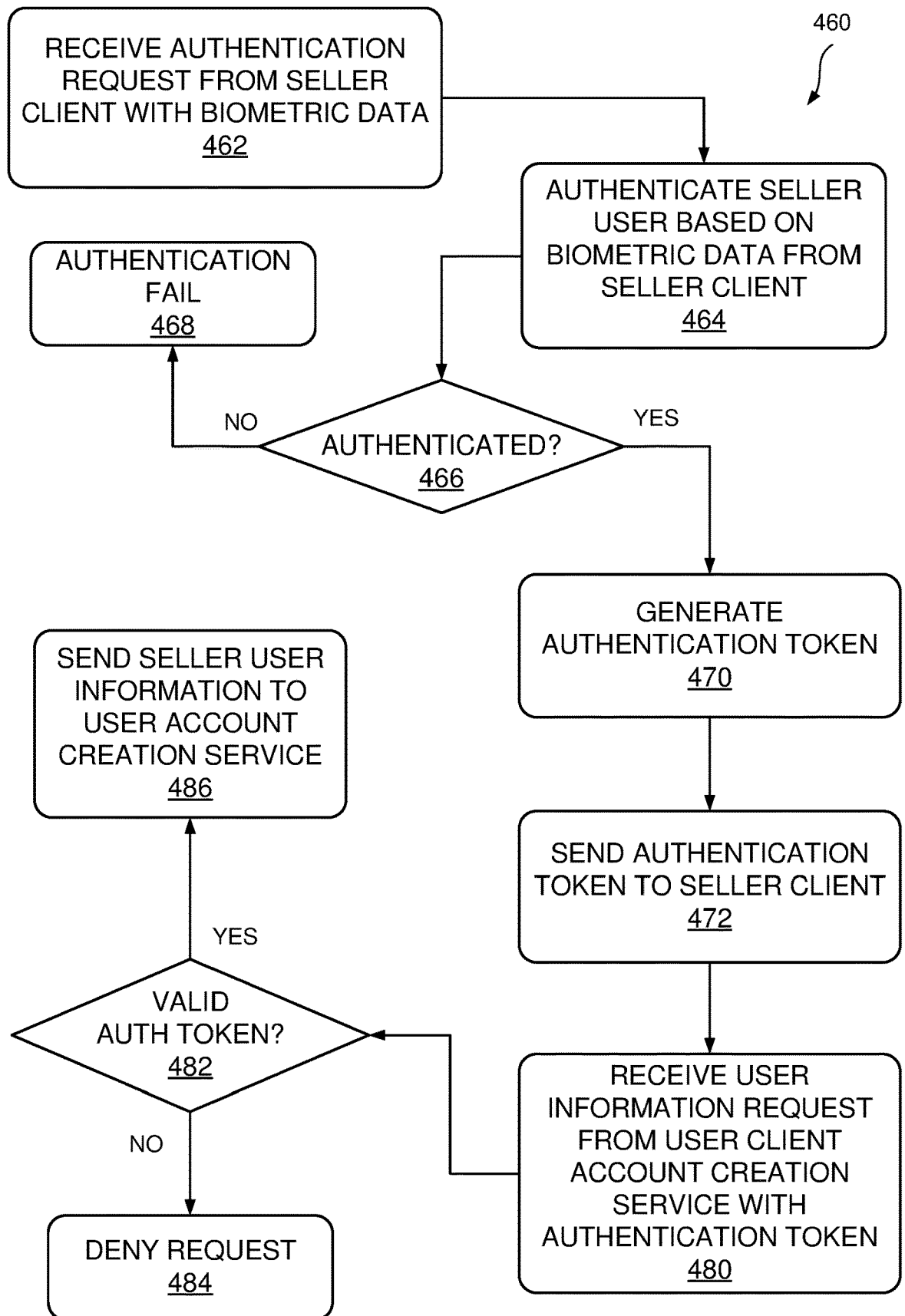
FIG. 4E is a control flow diagram showing further processing in an illustrative example of a process in an authentication service in accordance with the disclosed technology that creates an authentication token.

FIG. 4E is a control flow diagram showing further processing in an illustrative example of a process 460 in an authentication service that is configured to create an authentication token corresponding to a seller user and to provide user information to a user account creation service in accordance with the disclosed technology.

In this example, at 462, an authentication request is received from a seller client that includes biometric data for use in authenticating the user. At 464, the seller user is authenticated based on the biometric data from the seller client. If authentication fails, then control branches at 466 to 468 for appropriate action, e.g. lock the seller device, block further processing, etc.

If authentication is successful, control branches at 466 to 470 to generate an authentication token that corresponds to the authenticated user, i.e. the seller user. At 472, the authentication token is sent to the seller client.

The authentication token can be utilized by a user account creation service to obtain user information for the user corresponding to the authentication token. At 480, a user information request with an authentication token is received from a user client account creation service. If the authentication token is not valid, then control branches at 482 to 484 to deny the user information request or take other appropriate action to protect user information from unauthorized access.

If the authentication token is valid, then control branches at 482 to 486 to send the user information for the seller user corresponding to the authentication token to the user account creation service. The seller's user information provided by the authentication service can then be used to create the seller user account.

It should be appreciated that a variety of different instrumentalities and methodologies can be utilized to establish wireless communication as well as collect, exchange and display sensor and message data without departing from the teachings of the disclosed technology. The disclosed technology provides a high degree of flexibility and variation in the configuration of implementations without departing from the teachings of the present disclosure.

The present techniques may involve operations occurring in one or more machines. As used herein, "machine" means physical data-storage and processing hardware programed with instructions to perform specialized computing operations. It is to be understood that two or more different machines may share hardware components. For example, the same integrated circuit may be part of two or more different machines.

One of ordinary skill in the art will recognize that a wide variety of approaches may be utilized and combined with the present approach to buyer initiated seller account creation. The specific examples of different aspects of buyer initiated seller account creation described herein are illustrative and are not intended to limit the scope of the techniques shown.

Computer Architectures for Buyer Initiated Seller Account Creation

Figure 6:
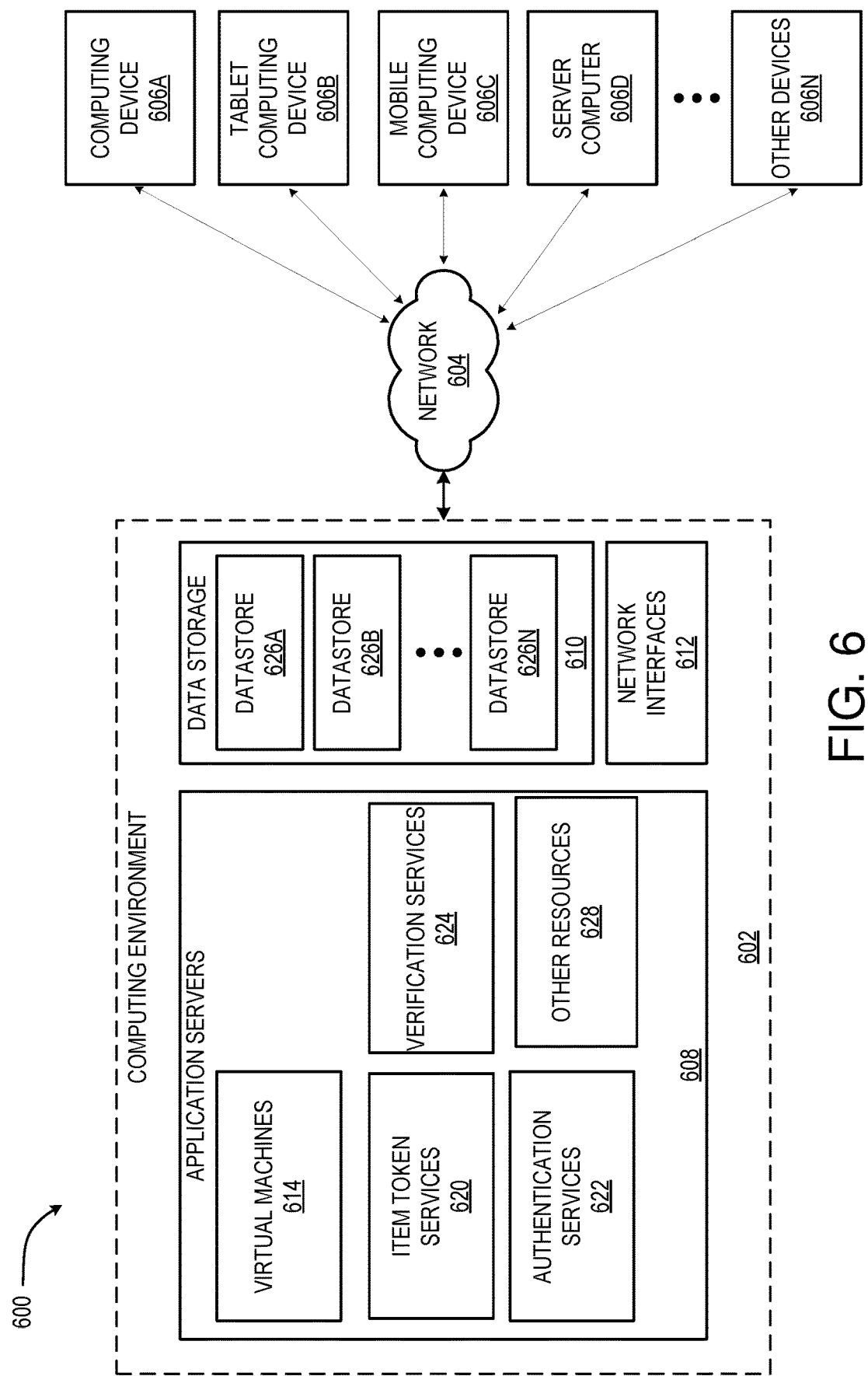
FIG. 6 is a diagram illustrating a distributed computing environment capable of implementing aspects of the techniques and technologies presented herein.

Note that at least parts of processes 300, 320, 340, 360 and 380 of FIGS. 3A-E and processes 400, 420, 432 and 460 of FIGS. 4A-E and other processes and operations pertaining to automatic user account creation described herein may be implemented in one or more servers, such as computer environment 600 in FIG. 6, or the cloud, and data defining the results of user control input signals translated or interpreted as discussed herein may be communicated to a user device for display. Alternatively, the automatic user account creation processes may be implemented in a client device. In still other examples, some operations may be implemented in one set of computing resources, such as servers, and other steps may be implemented in other computing resources, such as a client device.

It should be understood that the methods described herein can be ended at any time and need not be performed in their entireties. Some or all operations of the methods described herein, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

As described herein, in conjunction with the FIGURES described herein, the operations of the routines (e.g. processes 300, 320, 340, 360 and 380 of FIGS. 3A-E and processes 400, 420, 432 and 460 of FIGS. 4A-E) are described herein as being implemented, at least in part, by an application, component, and/or circuit. Although the following illustration refers to the components of FIGS. 3A-E and 4A-F, it can be appreciated that the operations of the routines may be also implemented in many other ways. For example, the routines may be implemented, at least in part, by a computer processor or a processor or processors of another computer. In addition, one or more of the operations of the routines may alternatively or additionally be implemented, at least in part, by a computer working alone or in conjunction with other software modules.

For example, the operations of routines are described herein as being implemented, at least in part, by an application, component and/or circuit, which are generically referred to herein as modules. In some configurations, the modules can be a dynamically linked library (DLL), a statically linked library, functionality produced by an application programing interface (API), a compiled program, an interpreted program, a script or any other executable set of instructions. Data and/or modules, such as the data and modules disclosed herein, can be stored in a data structure in one or more memory components. Data can be retrieved from the data structure by addressing links or references to the data structure.

Although the following illustration refers to the components of the FIGURES discussed above, it can be appreciated that the operations of the routines (e.g. processes 300, 320, 340, 360 and 380 of FIGS. 3A-E and processes 400, 420, 432 and 460 of FIGS. 4A-E) may be also implemented in many other ways. For example, the routines may be implemented, at least in part, by a processor of another remote computer or a local computer or circuit. In addition, one or more of the operations of the routines may alternatively or additionally be implemented, at least in part, by a chipset working alone or in conjunction with other software modules. Any service, circuit or application suitable for providing the techniques disclosed herein can be used in operations described herein.

Figure 5:
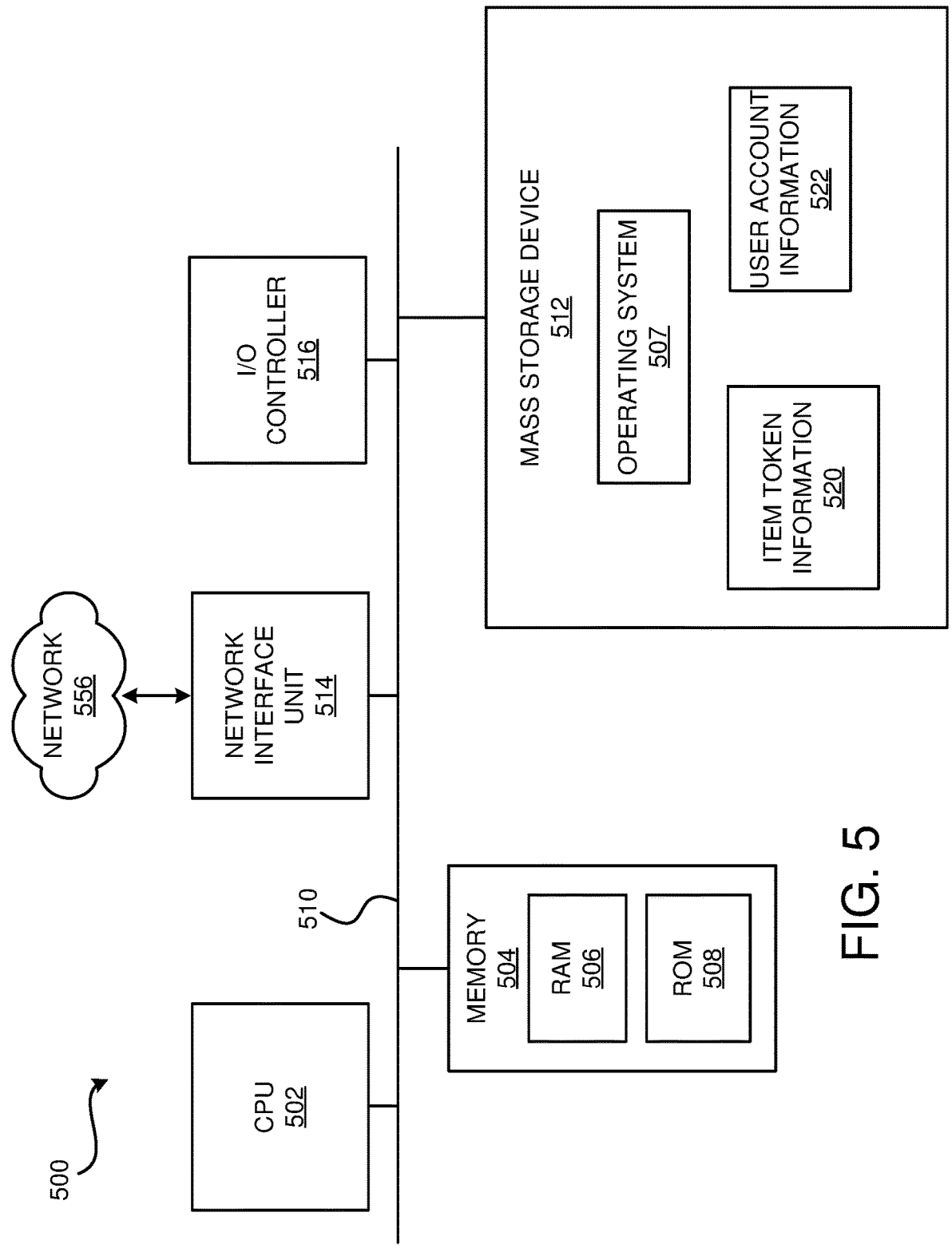
FIG. 5 is a computer architecture diagram illustrating an illustrative computer hardware and software architecture for a computing system capable of implementing aspects of the techniques and technologies presented herein.

FIG. 5 shows additional details of an example computer architecture 500 for a computer, such as the client devices 120 and services 130, 140 and 150 (FIGS. 1 and 2), capable of executing the program components described herein. Thus, the computer architecture 500 illustrated in FIG. 5 illustrates an architecture for an on-board vehicle computer, a server computer, mobile phone, a PDA, a smart phone, a desktop computer, a netbook computer, a tablet computer, an on-board computer, a game console, and/or a laptop computer. The computer architecture 500 may be utilized to execute any aspects of the software components presented herein.

The computer architecture 500 illustrated in FIG. 5 includes a central processing unit 502 ("CPU"), a system memory 504, including a random access memory 506 ("RAM") and a read-only memory ("ROM") 508, and a system bus 510 that couples the memory 504 to the CPU 502. A basic input/output system containing the basic routines that help to transfer information between sub-elements within the computer architecture 500, such as during startup, is stored in the ROM 508. The computer architecture 500 further includes a mass storage device 512 for storing an operating system 507, data (such as item token information 520 and user account information 522), and one or more application programs.

The mass storage device 512 is connected to the CPU 502 through a mass storage controller (not shown) connected to the bus 510. The mass storage device 512 and its associated computer-readable media provide non-volatile storage for the computer architecture 500. Although the description of computer-readable media contained herein refers to a mass storage device, such as a solid-state drive, a hard disk or CD-ROM drive, it should be appreciated by those skilled in the art that computer-readable media can be any available computer storage media or communication media that can be accessed by the computer architecture 500.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 500. For purposes the claims, the phrase "computer storage medium," "computer-readable storage medium" and variations thereof, does not include waves, signals, and/or other transitory and/or intangible communication media, per se.

According to various configurations, the computer architecture 500 may operate in a networked environment using logical connections to remote computers through the network 556 and/or another network (not shown). The computer architecture 500 may connect to the network 556 through a network interface unit 514 connected to the bus 510. It should be appreciated that the network interface unit 514 also may be utilized to connect to other types of networks and remote computer systems. The computer architecture 500 also may include an input/output controller 516 for receiving and processing input from a number of other devices, including a keyboard, mouse, game controller, television remote or electronic stylus (not shown in FIG. 5). Similarly, the input/output controller 516 may provide output to a display screen, a printer, or other type of output device (also not shown in FIG. 5).

It should be appreciated that the software components described herein may, when loaded into the CPU 502 and executed, transform the CPU 502 and the overall computer architecture 500 from a general-purpose computing system into a special-purpose computing system customized to facilitate the functionality presented herein. The CPU 502 may be constructed from any number of transistors or other discrete circuit elements, which may individually or collectively assume any number of states. More specifically, the CPU 502 may operate as a finite-state machine, in response to executable instructions contained within the software modules disclosed herein. These computer-executable instructions may transform the CPU 502 by specifying how the CPU 502 transitions between states, thereby transforming the transistors or other discrete hardware elements constituting the CPU 502.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 500 in order to store and execute the software components presented herein. It also should be appreciated that the computer architecture 500 may include other types of computing devices, including hand-held computers, embedded computer systems, personal digital assistants, and other types of computing devices known to those skilled in the art. It is also contemplated that the computer architecture 500 may not include all of the components shown in FIG. 5, may include other components that are not explicitly shown in FIG. 5, or may utilize an architecture completely different than that shown in FIG. 5.

FIG. 6 depicts an illustrative distributed computing environment 600 capable of executing the software components described herein for automatic user account creation. Thus, the distributed computing environment 600 illustrated in FIG. 6 can be utilized to execute many aspects of the software components presented herein. For example, the distributed computing environment 600 can be utilized to execute one or more aspects of the software components described herein.

According to various implementations, the distributed computing environment 600 includes a computing environment 602 operating on, in communication with, or as part of the network 604. The network 604 may be or may include the network 556, described above. The network 604 also can include various access networks. One or more client devices 606A-806N (hereinafter referred to collectively and/or generically as "clients 606") can communicate with the computing environment 602 via the network 604 and/or other connections (not illustrated in FIG. 6). In one illustrated configuration, the clients 606 include a computing device 606A, such as a laptop computer, a desktop computer, or other computing device; a slate or tablet computing device ("tablet computing device") 606B; a mobile computing device 606C such as a mobile telephone, a smart phone, an on-board computer, or other mobile computing device; a server computer 606D; and/or other devices 606N, which can include a hardware security module. It should be understood that any number of devices 606 can communicate with the computing environment 602. Two example computing architectures for the devices 606 are illustrated and described herein with reference to FIGS. 5 and 7. It should be understood that the illustrated devices 606 and computing architectures illustrated and described herein are illustrative only and should not be construed as being limited in any way.

In the illustrated configuration, the computing environment 602 includes application servers 608, data storage 610, and one or more network interfaces 612. According to various implementations, the functionality of the application servers 608 can be provided by one or more server computers that are executing as part of, or in communication with, the network 604. The application servers 608 can host various services, virtual machines, portals, and/or other resources. In the illustrated configuration, the application servers 608 host one or more virtual machines 614 for hosting applications or other functionality. According to various implementations, the virtual machines 614 host one or more applications and/or software modules for buyer initiated seller account creation. It should be understood that this configuration is illustrative only and should not be construed as being limiting in any way.

According to various implementations, the application servers 608 also include one or more item token services 620, authentication services 622, verification services 624. The item token services 620 can include services for issuing item tokens for items. The authentication services 622 can include services for handling authentication requests, issuing authentication tokens and managing and providing user information. The verification services 624 can include services for managing account information with respect to users.

As shown in FIG. 6, the application servers 608 also can host other services, applications, portals, and/or other resources ("other resources") 628. The other resources 628 can include, but are not limited to, data encryption, data sharing, or any other functionality.

As mentioned above, the computing environment 602 can include data storage 610. According to various implementations, the functionality of the data storage 610 is provided by one or more databases or data stores operating on, or in communication with, the network 604. The functionality of the data storage 610 also can be provided by one or more server computers configured to host data for the computing environment 602. The data storage 610 can include, host, or provide one or more real or virtual data stores 626A-826N (hereinafter referred to collectively and/or generically as "datastores 626"). The datastores 626 are configured to host data used or created by the application servers 608 and/or other data. Aspects of the datastores 626 may be associated with services for buyer initiated seller account creation. Although not illustrated in FIG. 6, the datastores 626 also can host or store web page documents, word documents, presentation documents, data structures, algorithms for execution by a recommendation engine, and/or other data utilized by any application program or another module.

The computing environment 602 can communicate with, or be accessed by, the network interfaces 612. The network interfaces 612 can include various types of network hardware and software for supporting communications between two or more computing devices including, but not limited to, mobile client vehicles, the clients 606 and the application servers 608. It should be appreciated that the network interfaces 612 also may be utilized to connect to other types of networks and/or computer systems.

It should be understood that the distributed computing environment 600 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 600 may provide the software functionality described herein as a service to the clients using devices 606. It should be understood that the devices 606 can include real or virtual machines including, but not limited to, server computers, web servers, personal computers, mobile computing devices, smart phones, and/or other devices, which can include user input devices. As such, various configurations of the concepts and technologies disclosed herein enable any device configured to access the distributed computing environment 600 to utilize the functionality described herein for buyer initiated seller account creation, among other aspects.

Figure 7:
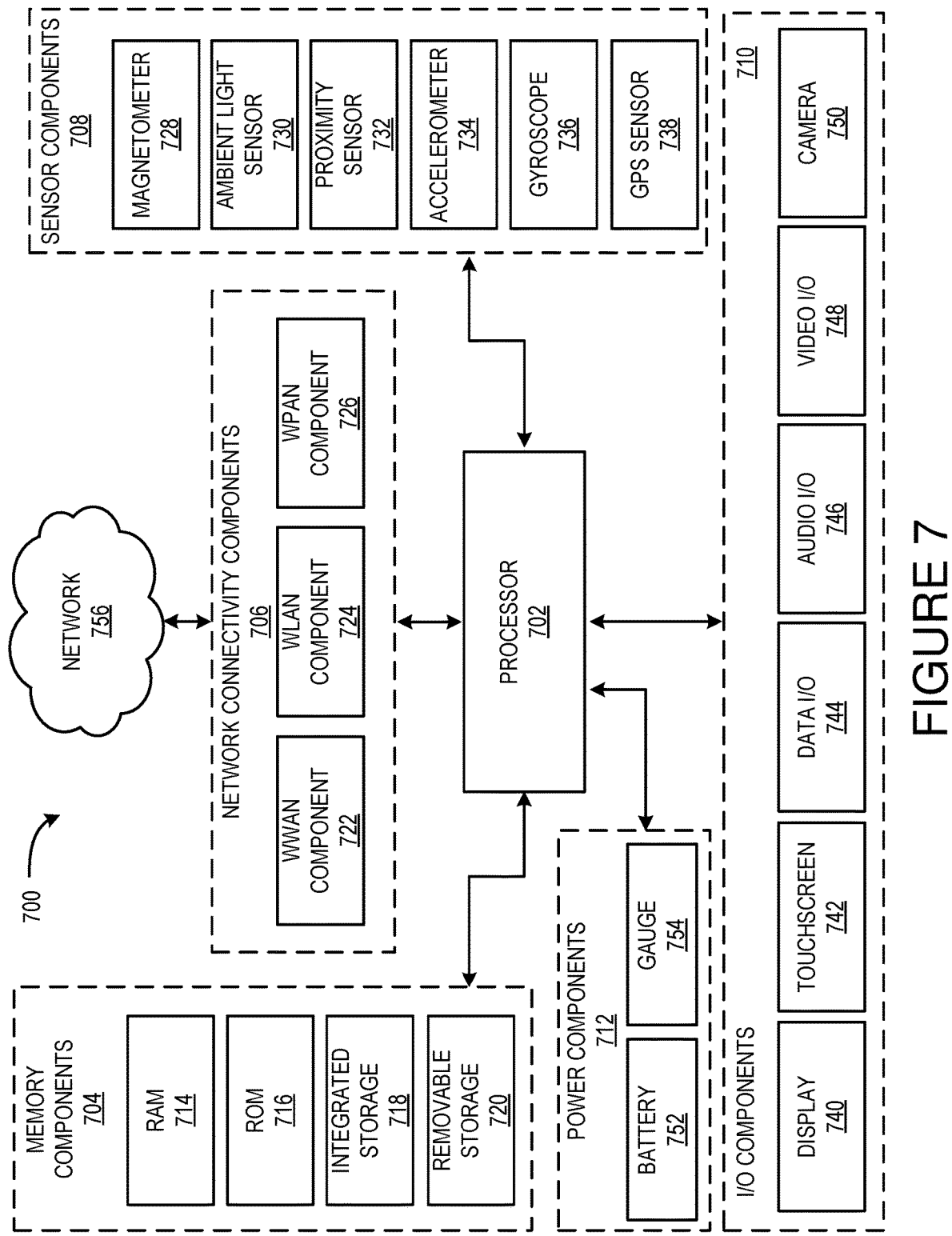
FIG. 7 is a computer architecture diagram illustrating a computing device architecture for a computing device capable of implementing aspects of the techniques and technologies presented herein.

Turning now to FIG. 7, an illustrative computing device architecture 700 for a computing device that is capable of executing various software components is described herein for automatic user account creation. The computing device architecture 700 is applicable to computing devices such as mobile clients in vehicles. In some configurations, the computing devices include, but are not limited to, mobile telephones, on-board computers, tablet devices, slate devices, portable video game devices, traditional desktop computers, portable computers (e.g., laptops, notebooks, ultra-portables, and netbooks), server computers, game consoles, and other computer systems. The computing device architecture 700 is applicable to the client device 110 and client/servers 120A-C shown in FIGS. 1, 2A-C, and computing device 606A-N shown in FIG. 6.

The computing device architecture 700 illustrated in FIG. 7 includes a processor 702, memory components 704, network connectivity components 706, sensor components 708, input/output components 710, and power components 712. In the illustrated configuration, the processor 702 is in communication with the memory components 704, the network connectivity components 706, the sensor components 708, the input/output ("I/O") components 710, and the power components 712. Although no connections are shown between the individual components illustrated in FIG. 7, the components can interact to carry out device functions. In some configurations, the components are arranged so as to communicate via one or more busses (not shown).

The processor 702 includes a central processing unit ("CPU") configured to process data, execute computer-executable instructions of one or more application programs, and communicate with other components of the computing device architecture 700 in order to perform various functionality described herein. The processor 702 may be utilized to execute aspects of the software components presented herein and, particularly, those that utilize, at least in part, secure data.

In some configurations, the processor 702 includes a graphics processing unit ("GPU") configured to accelerate operations performed by the CPU, including, but not limited to, operations performed by executing secure computing applications, general-purpose scientific and/or engineering computing applications, as well as graphics-intensive computing applications such as high resolution video (e.g., 620P, 1080P, and higher resolution), video games, three-dimensional ("3D") modeling applications, and the like. In some configurations, the processor 702 is configured to communicate with a discrete GPU (not shown). In any case, the CPU and GPU may be configured in accordance with a co-processing CPU/GPU computing model, wherein a sequential part of an application executes on the CPU and a computationally-intensive part is accelerated by the GPU.

In some configurations, the processor 702 is, or is included in, a system-on-chip ("SoC") along with one or more of the other components described herein below. For example, the SoC may include the processor 702, a GPU, one or more of the network connectivity components 706, and one or more of the sensor components 708. In some configurations, the processor 702 is fabricated, in part, utilizing a package-on-package ("PoP") integrated circuit packaging technique. The processor 702 may be a single core or multi-core processor.

The processor 702 may be created in accordance with an ARM architecture, available for license from ARM HOLDINGS of Cambridge, United Kingdom. Alternatively, the processor 702 may be created in accordance with an x86 architecture, such as is available from INTEL CORPORATION of Mountain View, California and others. In some configurations, the processor 702 is a SNAPDRAGON SoC, available from QUALCOMM of San Diego, California, a TEGRA SoC, available from NVIDIA of Santa Clara, California, a HUMMINGBIRD SoC, available from SAMSUNG of Seoul, South Korea, an Open Multimedia Application Platform ("OMAP") SoC, available from TEXAS INSTRUMENTS of Dallas, Texas, a customized version of any of the above SoCs, or a proprietary SoC.

The memory components 704 include a random access memory ("RAM") 714, a read-only memory ("ROM") 716, an integrated storage memory ("integrated storage") 718, and a removable storage memory ("removable storage") 720. In some configurations, the RAM 714 or a portion thereof, the ROM 716 or a portion thereof, and/or some combination of the RAM 714 and the ROM 716 is integrated in the processor 702. In some configurations, the ROM 716 is configured to store a firmware, an operating system or a portion thereof (e.g., operating system kernel), and/or a bootloader to load an operating system kernel from the integrated storage 718 and/or the removable storage 720.

The integrated storage 718 can include a solid-state memory, a hard disk, or a combination of solid-state memory and a hard disk. The integrated storage 718 may be soldered or otherwise connected to a logic board upon which the processor 702 and other components described herein also may be connected. As such, the integrated storage 718 is integrated in the computing device. The integrated storage 718 is configured to store an operating system or portions thereof, application programs, data, and other software components described herein.

The removable storage 720 can include a solid-state memory, a hard disk, or a combination of solid-state memory and a hard disk. In some configurations, the removable storage 720 is provided in lieu of the integrated storage 718. In other configurations, the removable storage 720 is provided as additional optional storage. In some configurations, the removable storage 720 is logically combined with the integrated storage 718 such that the total available storage is made available as a total combined storage capacity. In some configurations, the total combined capacity of the integrated storage 718 and the removable storage 720 is shown to a user instead of separate storage capacities for the integrated storage 718 and the removable storage 720.

The removable storage 720 is configured to be inserted into a removable storage memory slot (not shown) or other mechanism by which the removable storage 720 is inserted and secured to facilitate a connection over which the removable storage 720 can communicate with other components of the computing device, such as the processor 702. The removable storage 720 may be embodied in various memory card formats including, but not limited to, PC card, CompactFlash card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 704 can store an operating system. According to various configurations, the operating system may include, but is not limited to, server operating systems such as various forms of UNIX certified by The Open Group and LINUX certified by the Free Software Foundation, or aspects of Software-as-a-Service (SaaS) architectures, such as MICROSFT AZURE from Microsoft Corporation of Redmond, Washington or AWS from Amazon Corporation of Seattle, Washington. The operating system may also include WINDOWS MOBILE OS from Microsoft Corporation of Redmond, Washington, WINDOWS PHONE OS from Microsoft Corporation, WINDOWS from Microsoft Corporation, MAC OS or IOS from Apple Inc. of Cupertino, California, and ANDROID OS from Google Inc. of Mountain View, California. Other operating systems are contemplated.

The network connectivity components 706 include a wireless wide area network component ("WWAN component") 722, a wireless local area network component ("WLAN component") 724, and a wireless personal area network component ("WPAN component") 726. The network connectivity components 706 facilitate communications to and from the network 756 or another network, which may be a WWAN, a WLAN, or a WPAN. Although only the network 756 is illustrated, the network connectivity components 706 may facilitate simultaneous communication with multiple networks, including the network 756 of FIG. 7. For example, the network connectivity components 706 may facilitate simultaneous communications with multiple networks via one or more of a WWAN, a WLAN, or a WPAN.

The network 756 may be or may include a WWAN, such as a mobile telecommunications network utilizing one or more mobile telecommunications technologies to provide voice and/or data services to a computing device utilizing the computing device architecture 700 via the WWAN component 722. The mobile telecommunications technologies can include, but are not limited to, Global System for Mobile communications ("GSM"), Code Division Multiple Access ("CDMA") ONE, CDMA7000, Universal Mobile Telecommunications System ("UMTS"), Long Term Evolution ("LTE"), and Worldwide Interoperability for Microwave Access ("WiMAX"). Moreover, the network 756 may utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications may be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 756 may be configured to provide voice and/or data communications with any combination of the above technologies. The network 756 may be configured to or be adapted to provide voice and/or data communications in accordance with future generation technologies.

In some configurations, the WWAN component 722 is configured to provide dual-multi-mode connectivity to the network 756. For example, the WWAN component 722 may be configured to provide connectivity to the network 756, wherein the network 756 provides service via GSM and UMTS technologies, or via some other combination of technologies. Alternatively, multiple WWAN components 722 may be utilized to perform such functionality, and/or provide additional functionality to support other non-compatible technologies (i.e., incapable of being supported by a single WWAN component). The WWAN component 722 may facilitate similar connectivity to multiple networks (e.g., a UMTS network and an LTE network).

The network 756 may be a WLAN operating in accordance with one or more Institute of Electrical and Electronic Engineers ("IEEE") 602.11 standards, such as IEEE 602.11a, 602.11b, 602.11g, 602.11n, and/or future 602.11 standard (referred to herein collectively as WI-FI). Draft 602.11 standards are also contemplated. In some configurations, the WLAN is implemented utilizing one or more wireless WI-FI access points. In some configurations, one or more of the wireless WI-FI access points are another computing device with connectivity to a WWAN that are functioning as a WI-FI hotspot. The WLAN component 724 is configured to connect to the network 756 via the WI-FI access points. Such connections may be secured via various encryption technologies including, but not limited to, WI-FI Protected Access ("WPA"), WPA2, Wired Equivalent Privacy ("WEP"), and the like.

The network 756 may be a WPAN operating in accordance with Infrared Data Association ("IrDA"), BLUETOOTH, wireless Universal Serial Bus ("USB"), Z-Wave, ZIGBEE, or some other short-range wireless technology. In some configurations, the WPAN component 726 is configured to facilitate communications with other devices, such as peripherals, computers, or other computing devices via the WPAN.

The sensor components 708 include a magnetometer 728, an ambient light sensor 730, a proximity sensor 732, an accelerometer 734, a gyroscope 736, and a Global Positioning System sensor ("GPS sensor") 738. It is contemplated that other sensors, such as, but not limited to, temperature sensors or shock detection sensors, also may be incorporated in the computing device architecture 700.

The I/O components 710 include a display 740, a touchscreen 742, a data I/O interface component ("data I/O") 744, an audio I/O interface component ("audio I/O") 746, a video I/O interface component ("video I/O") 748, and a camera 750. In some configurations, the display 740 and the touchscreen 742 are combined. In some configurations two or more of the data I/O component 744, the audio I/O component 746, and the video I/O component 748 are combined. The I/O components 710 may include discrete processors configured to support the various interfaces described below or may include processing functionality built-in to the processor 702.

The illustrated power components 712 include one or more batteries 752, which can be connected to a battery gauge 754. The batteries 752 may be rechargeable or disposable. Rechargeable battery types include, but are not limited to, lithium polymer, lithium ion, nickel cadmium, and nickel metal hydride. Each of the batteries 752 may be made of one or more cells.

The power components 712 may also include a power connector, which may be combined with one or more of the aforementioned I/O components 710. The power components 712 may interface with an external power system or charging equipment via an I/O component.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The present disclosure is made in light of the following clauses:

Clause 1. A computer-implemented method for buyer initiated seller account generation, the method comprising: in a buyer client: receiving a buyer user identification of a purchase item, responsive to receiving the buyer user identification of the purchase item, generating an item token corresponding to the purchase item, providing the item token to a seller client application; in the seller client, receiving the item token and, responsive thereto: authenticating a seller user of the seller client with an authentication service; receiving an authentication token corresponding to the seller user from the authentication service; sending an account creation request to an account creation service, the account creation request including the item token and the authentication token; in the account creation service, receiving the account creation request and, responsive thereto: sending a user information request to the authentication service with the authentication token; receiving seller information from the authentication service responsive to the user information request, the seller information corresponding to the seller user; creating a seller user account using at least some of the seller information received from the authentication service; committing a purchase transaction for the purchase item; and sending an item purchase confirmation to the buyer client, the item purchase confirmation including the item token.

Clause 2. The method of Clause 1, where: the method includes, in the account creation service: responsive to receiving the seller user information from the authentication service, sending a verification request to a verification service, the verification request including at least some of the seller user information received from the authentication service; receiving a verification response from the verification service; and the step of creating a seller user account using at least some of the seller information received from the authentication service comprises, responsive to receiving the verification response, creating a seller user account using at least some of the seller information received from the authentication service.

Clause 3. The method of Clause 1, wherein: the authentication service comprises a biometric confirmation service; and the step of authenticating a seller user with an authentication service comprises authenticating a seller user with an authentication service using biometric data collected from the seller user by the seller client.

Clause 4. The method of Clause 1, where: the step of creating a seller user account using at least some of the seller information received from the authentication service comprises: sending an account confirmation request that includes at least a portion of the seller user information to the seller client; receiving an account confirmation response from the seller client that includes at least the portion of the seller user information; and if the seller user information in the account confirmation response from the seller client is different from the seller user information sent to the seller client, revising the seller user information used to create the seller user account.

Clause 5. The method of Clause 1, where: the method includes: in the buyer client, sending the item token to the account creation service with buyer account information associated with the buyer user; in the account creation service, receiving the item token and the buyer account information associated with the buyer user; the step of committing a purchase transaction for the purchase item comprises: identifying the buyer account information received with the item token; transferring payment for the item that corresponds to the item token from a buyer account determined from the buyer account information to the seller user account.

Clause 6. The method of Clause 1, where: the method includes, in the account creation service: sending a purchase confirmation request with the item token corresponding to the purchase item to the buyer client; receiving a purchase confirmation response with the item token corresponding to the purchase item from the buyer client; responsive to receiving the purchase confirmation response: identifying the buyer account information received with the item token; and transferring payment for the item that corresponds to the item token from a buyer account determined from the buyer account information to the seller user account.

Clause 7. The method of Clause 1, where: the item token further comprises a machine readable code; the method includes, in the buyer client, displaying the machine readable code; the step of, in the seller client, receiving the item token from a buyer client comprises scanning the machine readable code displayed by the buyer client to obtain the item token.

Clause 8. Computer storage media having computer executable instructions stored thereon which, when executed by one or more processors, cause the processors to execute a method for buyer initiated seller account generation, the method comprising: in a buyer client: receiving a buyer user identification of a purchase item, responsive to receiving the buyer user identification of the purchase item, generating an item token corresponding to the purchase item, providing the item token to a seller client application; in the seller client, receiving the item token and, responsive thereto: authenticating a seller user of the seller client with an authentication service; receiving an authentication token corresponding to the seller user from the authentication service; sending an account creation request to an account creation service, the account creation request including the item token and the authentication token; in the account creation service, receiving the account creation request and, responsive thereto: sending a user information request to the authentication service with the authentication token; receiving seller information from the authentication service responsive to the user information request, the seller information corresponding to the seller user; creating a seller user account using at least some of the seller information received from the authentication service; committing a purchase transaction for the purchase item; and sending an item purchase confirmation to the buyer client, the item purchase confirmation including the item token.

Clause 9. The computer readable media of Clause 8, where: the method includes, in the account creation service: responsive to receiving the seller user information from the authentication service, sending a verification request to a verification service, the verification request including at least some of the seller user information received from the authentication service; receiving a verification response from the verification service; and the step of creating a seller user account using at least some of the seller information received from the authentication service comprises, responsive to receiving the verification response, creating a seller user account using at least some of the seller information received from the authentication service.

Clause 10. The computer readable media of Clause 8, wherein: the authentication service comprises a biometric confirmation service; and the step of authenticating a seller user with an authentication service comprises authenticating a seller user with an authentication service using biometric data collected from the seller user by the seller client.

Clause 11. The computer readable media of Clause 8, where: the step of creating a seller user account using at least some of the seller information received from the authentication service comprises: sending an account confirmation request that includes at least a portion of the seller user information to the seller client; receiving an account confirmation response from the seller client that includes at least the portion of the seller user information; and if the seller user information in the account confirmation response from the seller client is different from the seller user information sent to the seller client, revising the seller user information used to create the seller user account.

Clause 12. The computer readable media of Clause 8, where: the method includes: in the buyer client, sending the item token to the account creation service with buyer account information associated with the buyer user; in the account creation service, receiving the item token and the buyer account information associated with the buyer user; the step of committing a purchase transaction for the purchase item comprises: identifying the buyer account information received with the item token; transferring payment for the item that corresponds to the item token from a buyer account determined from the buyer account information to the seller user account.

Clause 13. The computer readable media of Clause 8, where: the method includes, in the account creation service: sending a purchase confirmation request with the item token corresponding to the purchase item to the buyer client; receiving a purchase confirmation response with the item token corresponding to the purchase item from the buyer client; responsive to receiving the purchase confirmation response: identifying the buyer account information received with the item token; and transferring payment for the item that corresponds to the item token from a buyer account determined from the buyer account information to the seller user account.

Clause 14. The computer readable media of Clause 8, where: the item token further comprises a machine readable code; the method includes, in the buyer client, displaying the machine readable code; the step of, in the seller client, receiving the item token from a buyer client comprises scanning the machine readable code displayed by the buyer client to obtain the item token.

Clause 15. A computer-implemented method for buyer initiated seller account generation, the method comprising: in a buyer client: receiving a buyer user identification of a purchase item, responsive to receiving the buyer user identification of the purchase item, generating an item token corresponding to the purchase item, providing the item token to a seller client application; in the seller client, receiving the item token and, responsive thereto: authenticating a seller user of the seller client with an authentication service; receiving an authentication token corresponding to the seller user from the authentication service; sending an account creation request to an account creation service, the account creation request including the item token and the authentication token; in the account creation service, receiving an account creation request from a seller client, the account creation request including an item token corresponding to a purchase item identified by a buyer client and an authentication token corresponding to a seller user; responsive to receiving the account creation request from the seller client, sending a user information request to the authentication service with the authentication token; receiving seller information from the authentication service responsive to the user information request, the seller information corresponding to the seller user; creating a seller user account using at least some of the seller information received from the authentication service; committing a purchase transaction for the purchase item; and sending an item purchase confirmation to the buyer client, the item purchase confirmation including the item token.

Clause 16. The method of Clause 15, where the method includes: responsive to receiving the seller user information from the authentication service, sending a verification request to a verification service, the verification request including at least some of the seller user information received from the authentication service; receiving a verification response from the verification service; and the step of creating a seller user account using at least some of the seller information received from the authentication service comprises, responsive to receiving the verification response, creating a seller user account using at least some of the seller information received from the authentication service.

Clause 17. The method of Clause 15, where: the step of creating a seller user account using at least some of the seller information received from the authentication service comprises: sending an account confirmation request that includes at least a portion of the seller user information to the seller client; receiving an account confirmation response from the seller client that includes at least the portion of the seller user information; and if the seller user information in the account confirmation response from the seller client is different from the seller user information sent to the seller client, revising the seller user information used to create the seller user account.

Clause 18. The method of Clause 15, where the method includes: receiving the item token and the buyer account information associated with the buyer user from the buyer client; the step of committing a purchase transaction for the purchase item comprises: identifying the buyer account information received with the item token; transferring payment for the item that corresponds to the item token from a buyer account determined from the buyer account information to the seller user account.

Clause 19. The method of Clause 15, where the method includes: sending a purchase confirmation request with the item token corresponding to the purchase item to the buyer client; receiving a purchase confirmation response with the item token corresponding to the purchase item from the buyer client; responsive to receiving the purchase confirmation response: identifying the buyer account information received with the item token; and transferring payment for the item that corresponds to the item token from a buyer account determined from the buyer account information to the seller user account.

Clause 20. The method of Clause 15, where the item token comprises a machine readable code generated by the buyer client.

Although the subject matter presented herein has been described in language specific to computer structural features, methodological and transformative acts, specific computing machinery, and computer readable media, it is to be understood that the subject matter set forth in the appended claims is not necessarily limited to the specific features, acts, or media described herein. Rather, the specific features, acts and mediums are disclosed as example forms of implementing the claimed subject matter.

The subject matter described above is provided by way of illustration only and should not be construed as limiting. Various modifications and changes can be made to the subject matter described herein without following the example configurations and applications illustrated and described, and without departing from the scope of the present disclosure, which is set forth in the following claims.

What is claimed is:

1. A computer-implemented method comprising:
   receiving, by a first device of a first user, a machine readable code by optically scanning the machine readable code directly from a display of a second user device of a second user, the machine readable code having been received at the second user device from an intermediary transaction server, the machine readable code including an item token uniquely identifying an item for a purchase transaction between the first user associated with the first user device and the second user associated with the second user device;
   responsive to receiving the machine readable code:
      authenticating, by the first device, the first user associated with the first user device,
      sending, by the first device to an authentication service, an authentication request for an authentication token in response to authenticating the first user,
      receiving, by the first device from the authentication service, the authentication token corresponding to the first user in response to the authentication request,
      sending, by the first device, an account creation request to the intermediary transaction service based on the machine readable code, wherein the account creation request comprises the item token and the authentication token, the account creation request causing the intermediary transaction service to generate a first account for the first user at the intermediary transaction service using information for the first user obtained using the authentication token and to facilitate the purchase transaction for the item between the first account for the first user and a second account for the second user;
      receiving, by the first device from the intermediary transaction server, an account creation confirmation request to generate the first account, wherein the account creation confirmation request comprises at least a portion of the information for the first user obtained using the authentication token;
      sending, by the first device to the intermediary transaction server, an account creation confirmation response in response to a confirmation of user input on the first user device; and
      receiving, by the first device, a transaction confirmation from the intermediary transaction service, wherein the transaction confirmation comprises information associated with the first account generated and completion of the purchase transaction of the item between the first account and the second account.

2. The method of claim 1, wherein authenticating the first user associated with the first user device comprises authenticating the first user using biometric data collected from the first user by the first user device.

3. The method of claim 1, wherein the machine readable code comprises a QR.

4. A non-transitory computer storage medium having computer executable instructions stored thereon which, when executed by one or more processors of a first user device, cause the one or more processors to execute operations comprising:
   receiving machine readable code by optically scanning the machine readable code directly from a display of a second user device of a second user, the machine readable code having been received at the second user device from an intermediary transaction service, the machine readable code comprising an item token uniquely identifying an item for a purchase transaction between the first user associated with the first user device and the second user associated with the second user device;
   responsive to receiving the machine readable code:
      authenticating the first user associated with the first user device,
      sending, to an authentication service, an authentication request for an authentication token in response to authenticating the first user,
      receiving, from an authentication service, the authentication token corresponding to the first user in response to the authentication request, and
      sending an account creation request to the intermediary transaction service based on the machine readable code, wherein the account creation request comprises the item token and the authentication token, the account creation request causing the intermediary transaction service to generate a first account for the first user at the intermediary transaction service using information for the first user obtained using the authentication token and to facilitate the purchase transaction for the item between the first account for the first user and a second account for the second user;
      receiving, from the intermediary transaction service, an account confirmation request to generate the first account, wherein the account confirmation request comprises at least a portion of the information for the first user obtained using the authentication token;
      sending, to the intermediary transaction server, an account creation confirmation response comprising a confirmation of user input on the first user device; and
      receiving, a transaction confirmation from the intermediary transaction service, wherein the transaction confirmation comprises information associated with the first account generated and completion of the purchase transaction of the item between the first account and the second account.

5. The non-transitory computer readable medium of claim 4, wherein authenticating the first user associated with the first user device comprises authenticating the first user using biometric data collected from the first user by the first user device.

6. The non-transitory computer readable medium of claim 4, wherein the machine readable code comprises a QR code.

7. A computer system comprising:
   a first device comprising:
      one or more processors;
      one or more computer storage media storing computer-executable instructions that, when executed by the one or more processors, causes the one or more processors to perform operations comprising:

receiving machine readable code by optically scanning the machine readable code directly from a display of a second user device of a second user, the machine readable code having been received at the second user device from an intermediary transaction service, the machine readable code comprising the item token uniquely identifying an item for a purchase transaction between first user associated with the first user device and the second user associated with the second user device;

responsive to receiving the machine readable code:
  authenticating the first user associated with the first user device,
  sending, to an authentication service, an authentication request for an authentication token in response to authenticating the first user,
  receiving, from an authentication service, the authentication token corresponding to the first user in response to the authentication request, and
  sending an account creation request to the intermediary transaction service based on the machine readable code, wherein the account creation request comprises the item token and the authentication token, the account creation request causing the intermediary transaction service to generate a first account for the first user at the intermediary transaction service using information for the first user obtained using the authentication token and to facilitate the purchase transaction of the item between the first account for the first user and a second account for the second user;
  receiving, from the intermediary transaction service, an account confirmation request to generate the first account, wherein the account confirmation request comprises at least a portion of the information for the first user obtained using the authentication token;
  sending, to the intermediary transaction server, an account creation confirmation response comprising a confirmation of user input on the first user device; and
  receiving a transaction confirmation from the intermediary transaction service, wherein the transaction confirmation comprises information associated with the first account generated and completion of the purchase transaction of the item between the first account and the second account.

8. The computer system of claim 7, wherein the machine readable code comprises a QR code.

9. The method of claim 1, wherein the authentication token comprises a unique code that securely identifies the first user.

10. The method of claim 1, wherein the intermediary transaction service obtains the information for the first user from the authentication service by providing the authentication token to the authentication service.

11. The method of claim 1, wherein the account creation confirmation response includes revised information for the first user.

12. The non-transitory computer readable medium of claim 4, wherein the authentication token comprises a unique code that securely identifies the first user.

13. The non-transitory computer readable medium of claim 4, wherein the intermediary transaction service obtains the information for the first user from the authentication service by providing the authentication token to the authentication service.

14. The non-transitory computer readable medium of claim 4, wherein the account creation confirmation response includes revised information for the first user.

15. The computer system of claim 7, wherein the authentication token comprises a unique code that securely identifies the first user.

16. The computer system of claim 7, wherein the intermediary transaction service obtains the information for the first user from the authentication service by providing the authentication token to the authentication service.

17. The computer system of claim 7, wherein the account creation confirmation response includes revised information for the first user.

* * * * *